United States Patent
Ballantyne et al.

(10) Patent No.: US 11,693,920 B2
(45) Date of Patent: Jul. 4, 2023

(54) AI-BASED INPUT OUTPUT EXPANSION ADAPTER FOR A TELEMATICS DEVICE AND METHODS FOR UPDATING AN AI MODEL THEREON

(71) Applicant: Geotab Inc., Oakville (CA)

(72) Inventors: William John Ballantyne, Kingston (CA); Javed Siddique, York (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/714,570

(22) Filed: Apr. 6, 2022

(65) Prior Publication Data

US 2023/0143809 A1    May 11, 2023

Related U.S. Application Data

(60) Provisional application No. 63/276,007, filed on Nov. 5, 2021.

(51) Int. Cl.
*G05B 13/02* (2006.01)
*G06N 3/08* (2023.01)

(52) U.S. Cl.
CPC .......... *G05B 13/0265* (2013.01); *G06N 3/08* (2013.01)

(58) Field of Classification Search
CPC .............................. G05B 13/0265; G06N 3/08
USPC ......................................................... 706/12
See application file for complete search history.

(56) References Cited

U.S. PATENT DOCUMENTS

| | | | |
|---|---|---|---|
| 9,405,970 B2 | 8/2016 | Israel | |
| 10,015,462 B1 | 7/2018 | Quach | |
| 10,276,212 B2 | 4/2019 | Richardson | |
| 2003/0138146 A1 | 7/2003 | Johnson | |
| 2010/0214130 A1 | 8/2010 | Weinmann | |
| 2010/0299021 A1 | 11/2010 | Jalili | |
| 2011/0320683 A1* | 12/2011 | Ueki | G06F 11/1441 711/E12.001 |

(Continued)

FOREIGN PATENT DOCUMENTS

JP    2005338401 A    12/2005

OTHER PUBLICATIONS

Anonymous: "Federated learning", Ekkono Solutions, Short White paper, May 1, 2020 (May 1, 2020), XP093030000, Retrieved from the Internet: URL:https://www.ekkono.ai/wp-content/uploads/2020/12/SWP_Federated_LEarning_Ekkono_Solutions_May_2020.pdf [retrieved on Mar. 8, 2023].

*Primary Examiner* — James D. Rutten
(74) *Attorney, Agent, or Firm* — Sherif A. Abdel-Kader

(57) ABSTRACT

Systems and methods by a telematics server are provided. The method includes receiving, over a network, training data including model input data and a known output label corresponding to the model input data from a first device, training a centralized machine-learning model using the training data, determining, by the centralized machine-learning model, an output label prediction certainty based on the model input data, determining an increase in the output label prediction certainty over a prior predicted output label certainty of the centralized machine-learning model, and sending, over the network, a machine-learning model update to a second device in response to determining that the increase in the output label prediction certainty is greater than an output label prediction increase threshold.

15 Claims, 18 Drawing Sheets

(56) References Cited

U.S. PATENT DOCUMENTS

| | | | |
|---|---|---|---|
| 2013/0282925 A1* | 10/2013 | Cawse | G06F 13/385 |
| | | | 710/2 |
| 2014/0133706 A1 | 5/2014 | Conradt | |
| 2014/0294242 A1 | 10/2014 | Conradt | |
| 2016/0343145 A1 | 11/2016 | Israel | |
| 2017/0315523 A1* | 11/2017 | Cross | G05B 17/02 |
| 2018/0009445 A1* | 1/2018 | Nishi | G06N 7/005 |
| 2018/0018590 A1 | 1/2018 | Szeto | |
| 2018/0021122 A1 | 1/2018 | Johnsen | |
| 2018/0211122 A1* | 7/2018 | Amico | G07C 5/004 |
| 2018/0232639 A1* | 8/2018 | Lin | G06N 3/08 |
| 2018/0260737 A1* | 9/2018 | Tanaka | G06F 16/353 |
| 2018/0373980 A1 | 12/2018 | Huval | |
| 2019/0007433 A1* | 1/2019 | McLane | H04L 9/0643 |
| 2020/0398859 A1* | 12/2020 | Borhan | F01N 3/2066 |
| 2021/0056048 A1 | 2/2021 | Cawse | |
| 2021/0081754 A1 | 3/2021 | Frolova | |
| 2021/0192215 A1 | 6/2021 | Mungo | |
| 2021/0294328 A1 | 9/2021 | Zheng | |
| 2022/0028186 A1 | 1/2022 | Leadbeater | |
| 2022/0180647 A1 | 6/2022 | Al-Husseini | |

\* cited by examiner

AI-BASED INPUT OUTPUT EXPANSION ADAPTER FOR A TELEMATICS DEVICE AND METHODS FOR UPDATING AN AI MODEL THEREON

FIELD

The present disclosure relates generally to telematics, and more specifically to an artificial Intelligence (AI)-based input/output (I/O) expansion adapter for a telematics device, and method for updating an AI model on the I/O expansion adapter.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port. The gathered asset data may include engine speed, battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method by a telematics server. The method comprises receiving over a network training data including model input data and a known output label corresponding to the model input data from a first device, training a centralized machine-learning model using the training data, determining by the centralized machine-learning model an output label prediction certainty based on the model input data, determining an increase in the output label prediction certainty over a prior predicted output label certainty of the centralized machine-learning model, and sending, over the network, a machine-learning model update to a second device in response to determining that the increase in the output label prediction certainty is greater than an output label prediction increase threshold.

Determining the output label prediction certainty may comprise running the model input data through the centralized machine-learning model to obtain a predicted output label and comparing the predicted output label with the known output label.

Determining the increase in the output label prediction certainty over a prior output label certainty may comprise comparing the output label prediction certainty with the output label prediction certainty of a prior machine-learning model update.

The output label prediction increase threshold may comprise a percentage increase in the output label prediction certainty.

The first device may comprise a first telematics device coupled to a first asset and coupled with a first input/output (I/O) expander.

The model input data may comprise I/O expansion data provided by the first I/O expander.

The known output label may comprise asset data.

The first device may comprise at least one telematics device coupled to an asset and coupled with an I/O expansion adapter which is coupled with an I/O expander.

The model input data comprise I/O expansion data provided by the I/O expander.

The known output label may comprise asset data.

The model input data may comprise at least one image of a vehicle's dashboard and the known output label comprises a vehicle parameter corresponding to a gauge on the vehicle's dashboard.

The model input data may comprise at least one image of a vehicle's driver and the known output label comprises a vehicle parameter indicating whether a driver seatbelt of a vehicle is fastened.

The second device may comprise at least one telematics device coupled with an I/O expansion adapter which is coupled to an I/O expander.

Sending the machine-learning model update may further be done periodically.

Sending the machine-learning model update may further be done in response to receiving, from the second device, a machine-learning model update request.

In another aspect of the present disclosure, there is provided a telematics server comprising a controller, a network interface coupled to the controller, and a memory storing machine-executable programming instructions. The machine-executable programming instructions when executed by the controller configure the telematics server to receive training data including model input data and a known output label corresponding to the model input data from a first device, train a centralized machine-learning model using the training data; determine by the centralized machine-learning model an output label prediction certainty based on the model input data, determine an increase in the output label prediction certainty over a prior predicted output label certainty of the centralized machine-learning model, and send a machine-learning model update to a second device in response to determining that the increase in the output label prediction certainty is greater than an output label prediction increase threshold.

The machine-executable programming instructions which cause the telematics server to determine the output label prediction certainty may comprise machine-executable programming instructions which cause the telematics server to run the model input data through the centralized machine-learning model to obtain a predicted output label and compare the predicted output label with the known output label.

The machine-executable programming instructions which cause the telematics server to determine the increase in the output label prediction certainty over a prior output label certainty may comprise machine-executable programming instructions which cause the telematics server to compare the output label prediction certainty with the output label prediction certainty of a prior machine-learning model update.

The output label prediction increase threshold may comprise a percentage increase in the output label prediction certainty.

The first device may comprise a first telematics device coupled to a first asset and coupled with a first input/output (I/O) expander.

In a further aspect of the present disclosure, there is provided a non-transitory machine-readable storage medium storing machine-executable programming instructions that when executed cause a controller to receive training data including model input data and a known output label corresponding to the model input data from a first device, train a centralized machine-learning model using the training data, determine by the centralized machine-learning model, an output label prediction certainty based on the model input data, a determine an increase in the output label prediction certainty over a prior predicted output label certainty of the centralized machine-learning model, and send a machine-learning model update to a second device in response to determining that the increase in the output label prediction certainty is greater than an output label prediction increase threshold.

In yet another aspect of the present disclosure, there is provided a method by an input/output expansion adapter coupled to a telematics device, comprising receiving raw I/O expansion data from an I/O expander, processing the raw I/O expansion data into processed I/O expansion data, and sending the processed I/O expansion data to the telematics device.

In a further aspect of the present disclosure, there is provided an I/O expansion adapter comprising a controller, a network interface coupled to the controller, and a memory storing machine-executable programming instructions. The machine-executable programming instructions when executed by the controller, configures the I/O expansion adapter to receive raw I/O expansion data from an I/O expander, process the raw I/O expansion data into processed I/O expansion data, and send the processed I/O expansion data, over the network interface, to a telematics device.

In a further aspect of the present disclosure, there is provided a non-transitory machine-readable storage medium storing machine-executable programming instructions that when executed cause a controller to receive raw I/O expansion data from an I/O expander, process the raw I/O expansion data into processed I/O expansion data, and send the processed I/O expansion data, over a network interface, to a telematics device.

In another aspect of the present disclosure, there is provided a method by a telematics server. The method comprises receiving over a network a focused update for a machine-learning model from at least one device, improving a prediction of a centralized machine-learning model using the focused update and determining an increase in an output label prediction certainty over a prior predicted output label certainty of the centralized machine-learning-model. The method further comprises sending over the network a machine-learning model update to another device in response to determining that the increase in the output label prediction certainty is greater than an output label prediction increase threshold.

The at least one device may comprise a plurality of devices. Improving the prediction of the centralized machine-learning model may comprise averaging the focused update from the plurality of devices.

The focused update may comprise a plurality of updated model parameters.

In a further aspect of the present disclosure, there is provided a method performed by an input/output expansion adapter coupled to a telematics device. The method comprises receiving raw I/O expansion data from an I/O expander, receiving from the telematics device asset data corresponding to the raw I/O expansion data, training a machine learning model using training data comprising the raw I/O expansion data and the asset data, and sending, over a network, a focused update to a centralized machine-learning model, based on the training.

DETAILED DESCRIPTION

Figure 1:
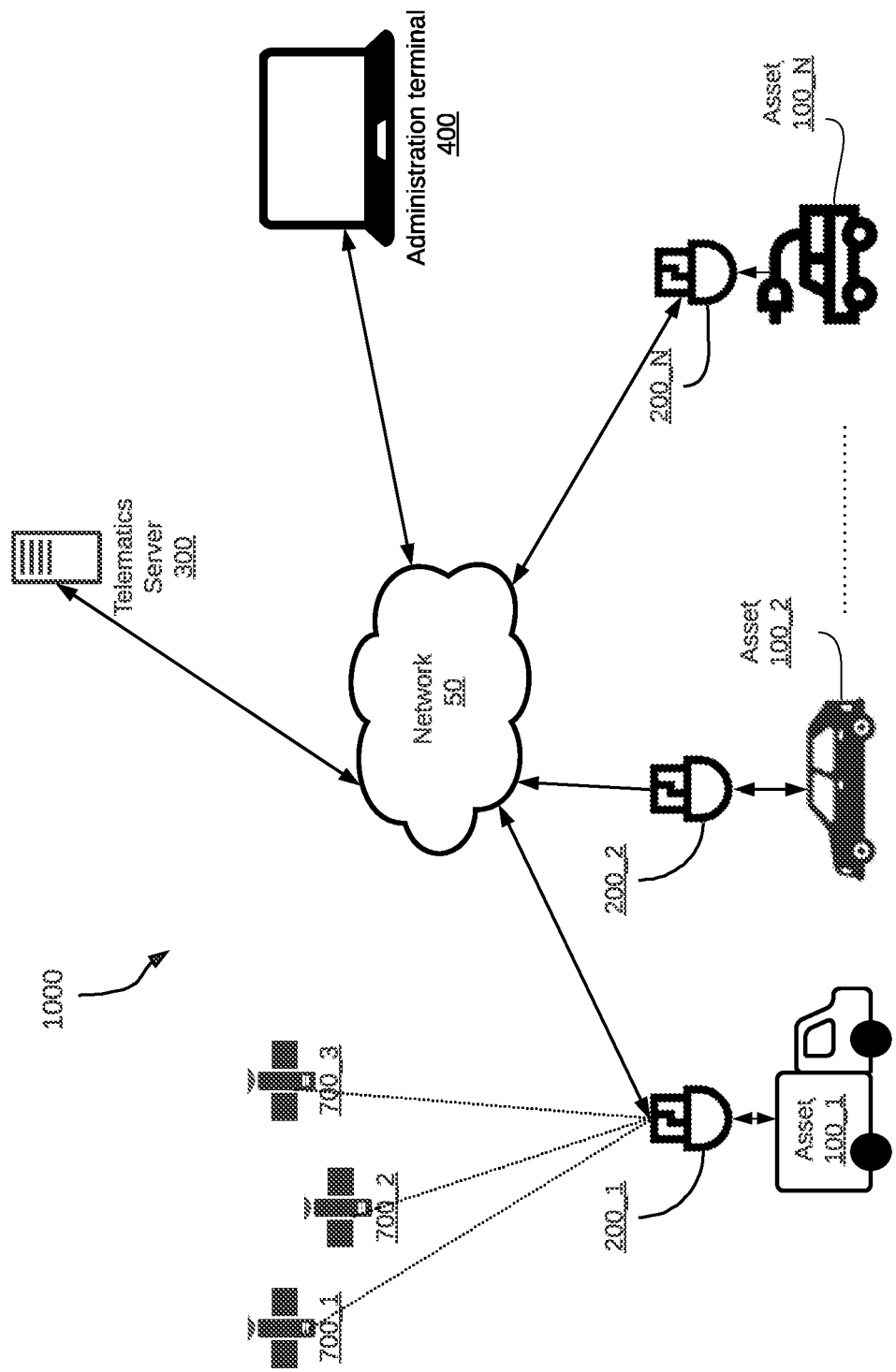
FIG. 1 is a schematic diagram of a telematics system including a plurality of telematics devices coupled to a plurality of assets, in accordance with embodiments of the present disclosure.

A large telematics system may collect data from a high number of assets, either directly or through telematic devices. A telematics device may refer to a self-contained device installed at an asset, or a telematics device that is integrated into the asset itself. In either case, it may be said that data is being captured or gathered by the telematics device. FIG. 1 shows a high-level block diagram of a telematics system 1000. The telematics system 1000 includes a telematics server 300, (N) telematics devices shown as telematics device 200_1, telematics device 200_2 . . . through telematics device 200_N ("telematics device 200"), a network 50, and an administration terminal 400. FIG. 1 also shows a plurality of (N) assets named as asset 100_1, asset 100_2 . . . asset 100_N ("asset 100") coupled to the telematics devices 200, and a plurality of satellites 700_1, 700_2 and 700_3 ("satellite 700") in communication with the telematics devices 200.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). While the assets have been shown as vehicles, in some examples they may be airborne vehicles such as airplanes, helicopters, or drones. In other examples, the assets may be marine vehicles such as boats, ships, or submarines. In further examples, the assets may be stationary equipment such as industrial machines.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, and between the administration terminal 400 and the telematics server 300.

The satellites 700 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device that can periodically report an asset's location is often termed an "asset tracking device".

Figure 10:
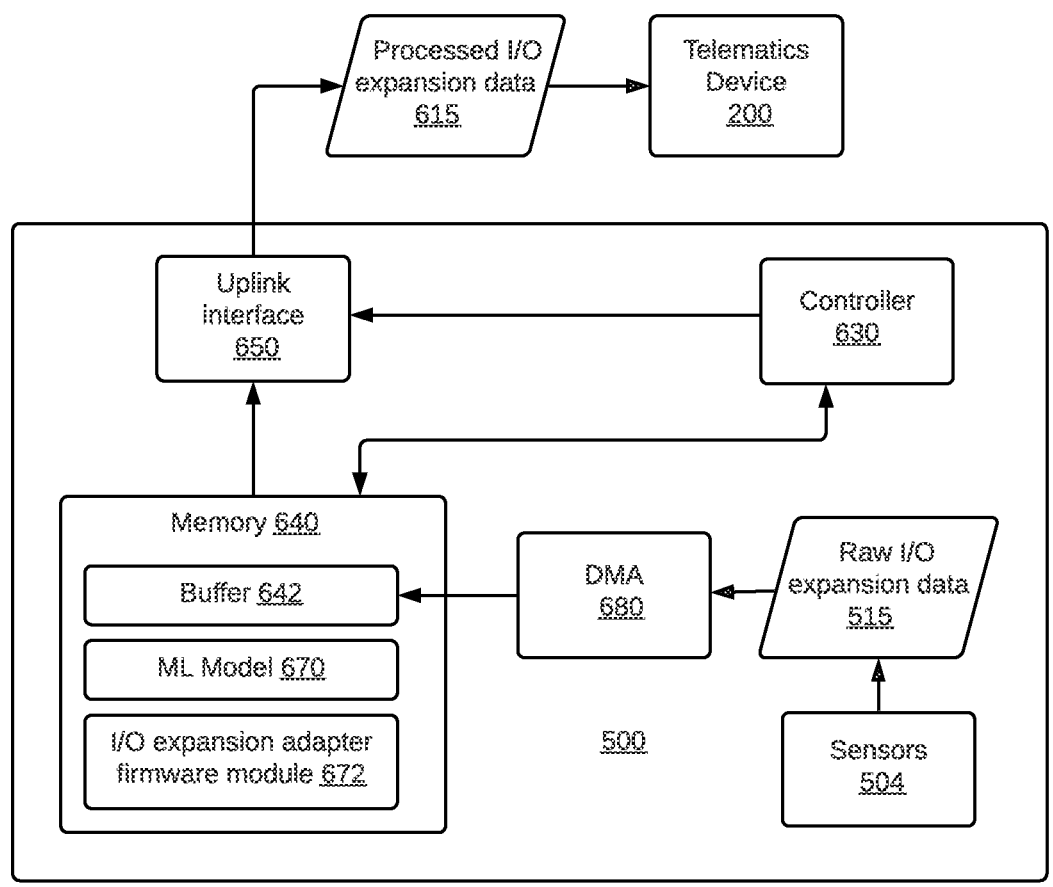
FIG. 10 is a block diagram of an I/O expander which integrates the features of an I/O expander and an I/O expansion adapter in a single device, in accordance with embodiments of the present disclosure.

A telematics server 300 is an electronic device having a large data store and powerful processing capability. With reference to FIG. 10, the telematics server 300 has a controller 330, a network interface 320 for connecting to the network 50, and a memory 340 for storing software modules. The memory of the telematics server 300 contains software modules which when executed the controller perform analysis of telematics data sent to the telematics server 300 by the plurality of telematics devices 200. By way of example, the telematics server 300 may receive telematics data including asset data and location data from a telematics device 200 coupled to an asset 100. The asset data may relate to the fuel status of a vehicular asset 100 making a delivery to a destination. The location data indicates the present location of the telematics device 200 coupled to the vehicular asset 100. The telematics server may determine, based on both the asset data and the location data, whether the asset 100 (e.g., a truck) would be able to make the delivery or needs to be refueled. The telematics server 300 is connected to the network 50 over the network interface 320. The information and analysis provided by the telematics server 300 may be accessible, over the network 50, for viewing and inspection. The telematics server 300 may, for example, provide a web interface 325 through which telematics data gathered from one or more of the plurality of assets 100, as well as analytics related to the telematics data may be accessed. Alternatively, or additionally, the telematics server 300 may push telematics data and analytics related to one or more assets 100 to one or more electronic devices such as smartphones running a mobile application.

Turning back to FIG. 1, the administration terminal 400 is an electronic device, which may be used to connect to the telematics server 300 to retrieve data and analytics related to one or more assets 100. The administration terminal 400 may be a desktop computer, a laptop computer, a tablet, or a smartphone. The administration terminal 400 may run a web browser or a custom application which allows retrieving data and analytics, pertaining to one or more assets 100, from the telematics server 300 via a web interface of the telematics server.

In operation, a telematics device 200 is coupled to an asset 100 to capture asset data. The asset data may be combined with location data obtained by the telematics device 200 from a location module in communication with the satellites 700 and/or sensor data gathered from sensors in the telematics device 200. The combined data may be termed "telematics data". The telematics device 200 sends the telematics data, to the telematics server 300 over the network 50. The telematics server 300 may process, aggregate, and analyze the telematics data to generate information about the assets 100 or a fleet of assets. The administration terminal 400 may connect to the telematics server 300, over the network 50, to access the generated information. Alternatively, the telematics server 300 may push the generated information to the administration terminal 400.

In the attached figures, a telematics device 200 is shown as a separate entity connected with a corresponding asset. It would be, however, apparent to those of skill in the art that other configurations are possible. For example, the telematics device 200 may be integrated with the asset 100 at the time of manufacturing. In other examples, the telematics device may be deployed on an asset but not connected therewith. For example, a telematics device 200 may be deployed in a vehicular asset and may monitor the vehicle's temperature, location, speed, and direction of travel solely using sensors or peripherals on board the telematics device 200 such as a temperature sensor, a GPS receiver, an accelerometer, and a gyroscope.

Figure 2:
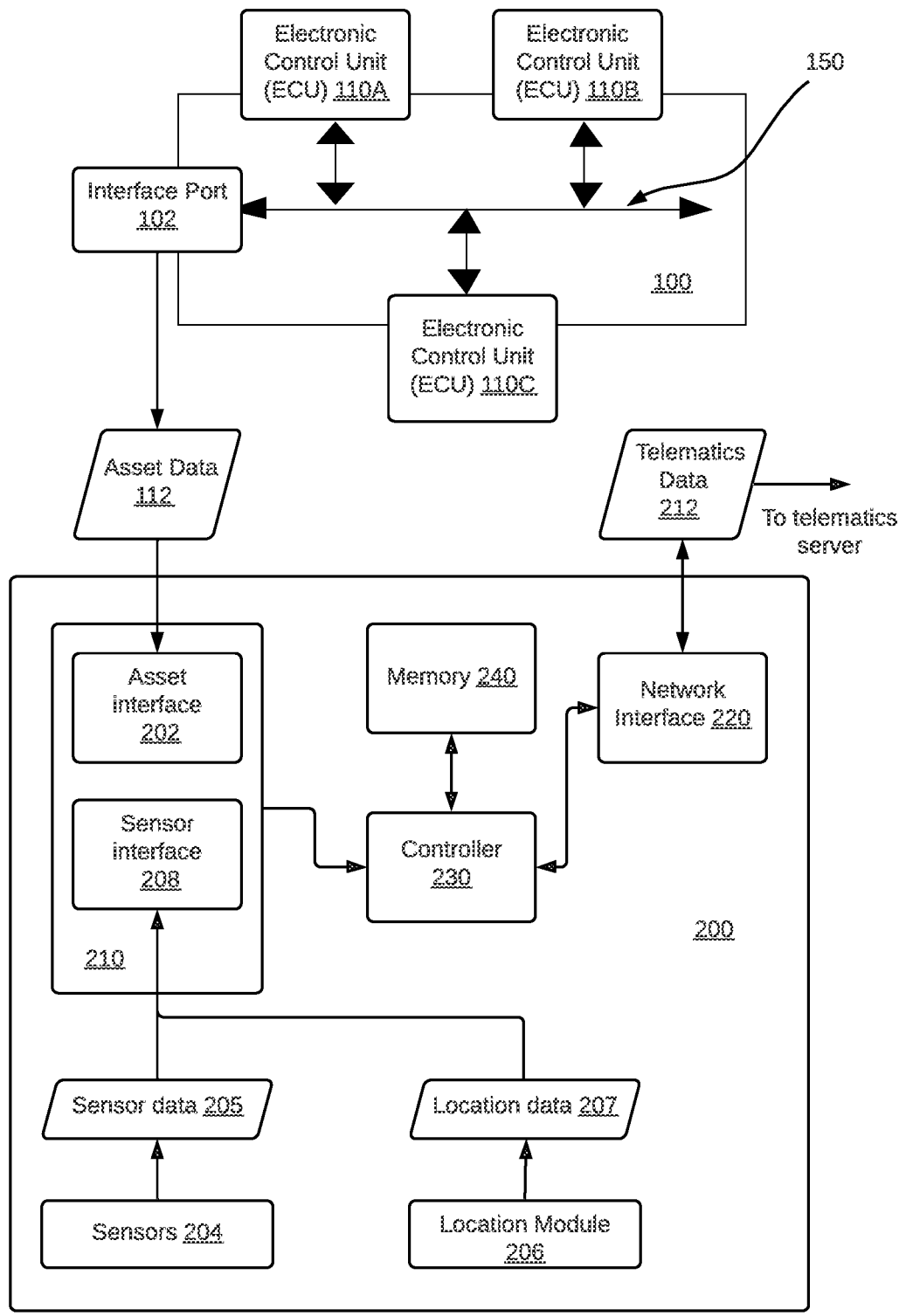
FIG. 2 is a block diagram showing a telematics device coupled to an asset, in accordance with embodiments of the present disclosure.

Further details relating to the telematics device 200 and how it interfaces with an asset 100 are shown with reference to FIG. 2. FIG. 2 depicts an asset 100 and a telematics device 200 connected thereto. Selected relevant components of each of the asset 100 and the telematics device 200 are shown. For example, while the asset 100 may be a vehicular asset, only components relevant to gathering asset data are shown in FIG. 2.

The asset 100 may have a plurality of electronic control units (ECUs). An ECU is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A typical vehicle may, for example, have around seventy ECUs. For simplicity, only a few of the ECUs 110 are depicted in FIG. 2. For example, in the depicted embodiment the asset 100 has three electronic control units: ECU 110A, ECU 110B, and ECU 110C ("ECUs 110"). The ECU 110A, the ECU 110B, and the ECU 110C are shown to be interconnected via a bus, such as a Controller Area Network (CAN) bus 150. ECUs 110 interconnected using a CAN bus send and receive information to one another in CAN frames by placing the information on the CAN bus 150. When an ECU places information on the CAN bus 150, other ECUs 110 receive the information and may or may not consume or use that information. Different protocols are used to exchange information between the ECUs over a CAN bus. For example, ECUs 110 in trucks and heavy vehicles use the Society of Automotive Engineering (SAE) J1939 protocol to exchange information over a CAN bus 150. Most passenger vehicles use the On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing power to a device connecting thereto.

The telematics device 200 includes a controller 230 coupled to a memory 240, an interface layer 210 and a network interface 220. The telematics device 200 also includes one or more sensors 204 and a location module 206 coupled to the interface layer. In some embodiments (not shown), the telematics device 200 may have a dedicated power source or a battery. In other embodiments, the telematics device 200 may receive power directly from the asset 100. The telematics device 200 shown is an example. Some of the depicted components may be optional. For example, some telematics devices may not have a location module 206 and may rely on an external location module for obtaining location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 300 over a network 50.

The location module 206 may be a global positioning system (GPS) transceiver or another type of location determination peripheral that may use, for example, wireless network information for location determination. The sensors 204 may be one or more of: a temperature sensor, a pressure sensor, an optical sensor, an accelerometer, a gyroscope, or any other suitable sensor indicating a condition pertaining to the asset 100 to which the telematics device 200 is coupled.

The interface layer 210 includes an asset interface 202 and a sensor interface 208. The sensor interface 208 is configured for receiving sensor data 205 and location data 207 from the sensors 204 and the location module 206, respectively. For example, the sensor interface 208 interfaces with the location module 206 and with the sensors 204 and receives both sensor data 205 and location data 207, respectively, therefrom. The interface layer 210 also includes an asset interface 202 to receive asset data 112 from the asset 100. In the depicted embodiment, the asset interface 202 is coupled to the interface port 102 of the asset 100. In other embodiments where the telematics device 200 is integrated into the asset 100, the asset interface 202 may receive the asset data 112 directly from the CAN bus 150. The asset data 112, received at the telematics device 200, from the asset 100 may be in the form of data messages, such as CAN frames. Asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine RPM, or a battery voltage). In addition to receiving the asset data 112, in some embodiments the asset interface 202 may also receive power from the asset 100 via the interface port 102. The interface layer 210 is coupled to the controller 230 and provides the asset data 112, sensor data 205, and location data 207 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 as to how to communicate with the asset 100.

In operation, an ECU 110, such as the ECU 110A, the ECU 110b, or the ECU 110C communicates asset data over the CAN bus 150. The asset data exchanged, between the ECUs 110, over the CAN bus 150 are accessible via the interface port 102 and may be retrieved as the asset data 112 by the telematics device 200. The controller 230 of the telematics device receives the asset data 112 via the asset interface 202. The controller 230 may also receive sensor data 205 from the sensor 204 and/or location data 207 from the location module 206 over the sensor interface 208. The controller 230 combines the asset data 112 with the sensor data 205 and the location data 207 to provide the telematics data 212. The controller 230 transmits the telematics data 212 to the telematics server 300 over the network 50 via the network interface 220.

While the asset data 112 captured from the asset 100 combined with the sensor data 205 and location data 207 may be sufficient for deriving useful data and analytics, there are times when additional data, which is not provided by the asset 100 or the peripherals on board the telematics device 200, may be needed. The telematics device 200 may have a limited number of sensors thus limiting the type and amount of sensor data captured and included in the telematics data 212. The location module 206 may provide location and direction information. However, in some cases, more information may be needed to derive useful data and analytics pertaining to the asset 100.

One example of information that is not typically provided by the telematics device 200 is video capture data. For example, it may be useful to capture a video of the road ahead of a travelling asset, such as a vehicle, using a dashboard camera. Video capture data obtained from a road-facing dashboard camera may be useful in case of accidents or to monitor the road conditions. While off-the-shelf standalone dashboard cameras are available, a standalone camera will not correlate the captured video data with the asset data 112, sensor data 205, and location data 207 gathered by the telematics device 200 since there is no connection between the standalone dashboard camera and the telematics device 200. As another example, it may be useful to capture video capture data of the driver of an asset 100 either to verify the identity of the driver or to determine if the driver is too impaired to drive. It may be useful to correlate the video capture data of the driver with asset data 112 such as vehicle parameters gathered by the telematics device 200. For example, the state of the driver captured by a camera correlated with the vehicle speed, direction of travel and other parameters may provide better insight than video capture data alone. In yet another example, in some vehicles some vehicle operating parameters such as speed, revolutions-per-minute (RPM), or odometer reading may not be provided at the interface port 102 at all or may not be provided in a standard format. In such cases, a video camera may be used to capture video frames of the gauges in the vehicle's dashboard to obtain such vehicle operating parameters. Correlating the video capture data of the vehicle's gauges with other asset data, sensor data, and location data may increase the usefulness of the video capture data.

Another example of information that is not typically provided by the telematics device 200 is any proprietary signaling provided by devices which does not follow any of the standard protocols (OBD-II, J1939 or CANOpen). Some equipment may not have a CAN bus and may only provide proprietary digital and/or analog signals. Examples of such devices include industrial equipment, winter maintenance equipment such as salt spreaders, farming equipment, and the like. Such devices may not be able to communicate directly with the telematics device 200 over the asset interface 202.

In some instances, it may be convenient to send commands to a telematics device 200 to request some information. When a vehicle asset 100 is in motion, it may not be feasible for the driver of the vehicle asset 100 to enter commands on the telematics device. A telematics device 200 deployed in a vehicle asset and plugged into the vehicle's OBD port, is typically too small to have enough buttons for user command input. In such a case, it may be convenient to allow some basic control of the telematics device by voice commands issued to the telematics device 200 by a driver. The commands may instruct the telematics device 200 to start logging a particular parameter from the asset data 112, or to ignore logging another parameter in the asset data 112. The commands may instruct the telematics device 200 to request particular information from the asset 100 by issuing a query on the CAN bus 150. A telematics device 200 is normally not equipped with audio capture equipment and/or voice recognition firmware.

In addition to the need to obtain information, which may not be generally available from the asset 100 and the telematics device 200, there are also times when the telematics device 200 needs to provide an output in an unsupported format. For example, the telematics device 200 may need to provide an alert to a user of a possible engine error condition or certain driving behavior in a vehicular asset. A telematics device 200 may have indicator lights, such as light emitting diodes (LEDs), which may be used to signal certain conditions. However, indicator lights in some cases are insufficient for reporting many operating conditions. The telematics device 200 may not have enough physical space for many indicator lights and the operating conditions that require reporting may be too many for a few indicator lights to accommodate. Additionally, in most vehicles the telematics device 200 may be connected to an OBD-II port which is generally located below the dashboard. As such the telematics device 200 and its indicator lights would not be visible at all times and therefore cannot be used to report critical information that requires immediate attention. A telematics device 200 may have a buzzer that produces sounds such as beeps to indicate error conditions or alerts that require a user's attention. However, simple beeps are difficult to interpret, and it is often more helpful to not just report an alert condition but to also propose a remedying action, which cannot be done by simple beeps. Accordingly, it may be useful for a telematics device 200 to be able to output messages either visually on a display or audibly by using an audio output device.

To capture and provide information not provided by the asset 100 or the telematics device 200; or to produce output, which is not supported by the telematics device 200, the telematics device 200 may be modified to allow an I/O expander to connect thereto. The I/O expander may be an input device configured to capture additional data such as video frames, audio frames, or proprietary signals and provide that data to the telematics device 200. Alternatively, or additionally, the I/O expander may be configured as an output device and may include a display for displaying information and/or an audio output device for broadcasting messages pertaining to the asset 100. An I/O expander packages any input data from a proprietary device or sensor into a standardized format termed "I/O expansion data". Similarly, any data sent by a telematics device 200 to an I/O expander is also "I/O expansion data" and may follow a standardized format. The standardized format ensures that multiple types of I/O expanders can all interoperate with the telematics device 200. An I/O expander exchanges I/O expansion data with a telematics device 200. A protocol for exchanging data between the telematics device 200 and an I/O expander can be defined. The protocol ensures that the telematics device 200 is able to exchange I/O expansion data with a plurality of I/O expanders. For example, the I/O expanders may follow one of the above-discussed protocols such as OBD, J1939, or CANopen.

Figure 3A:
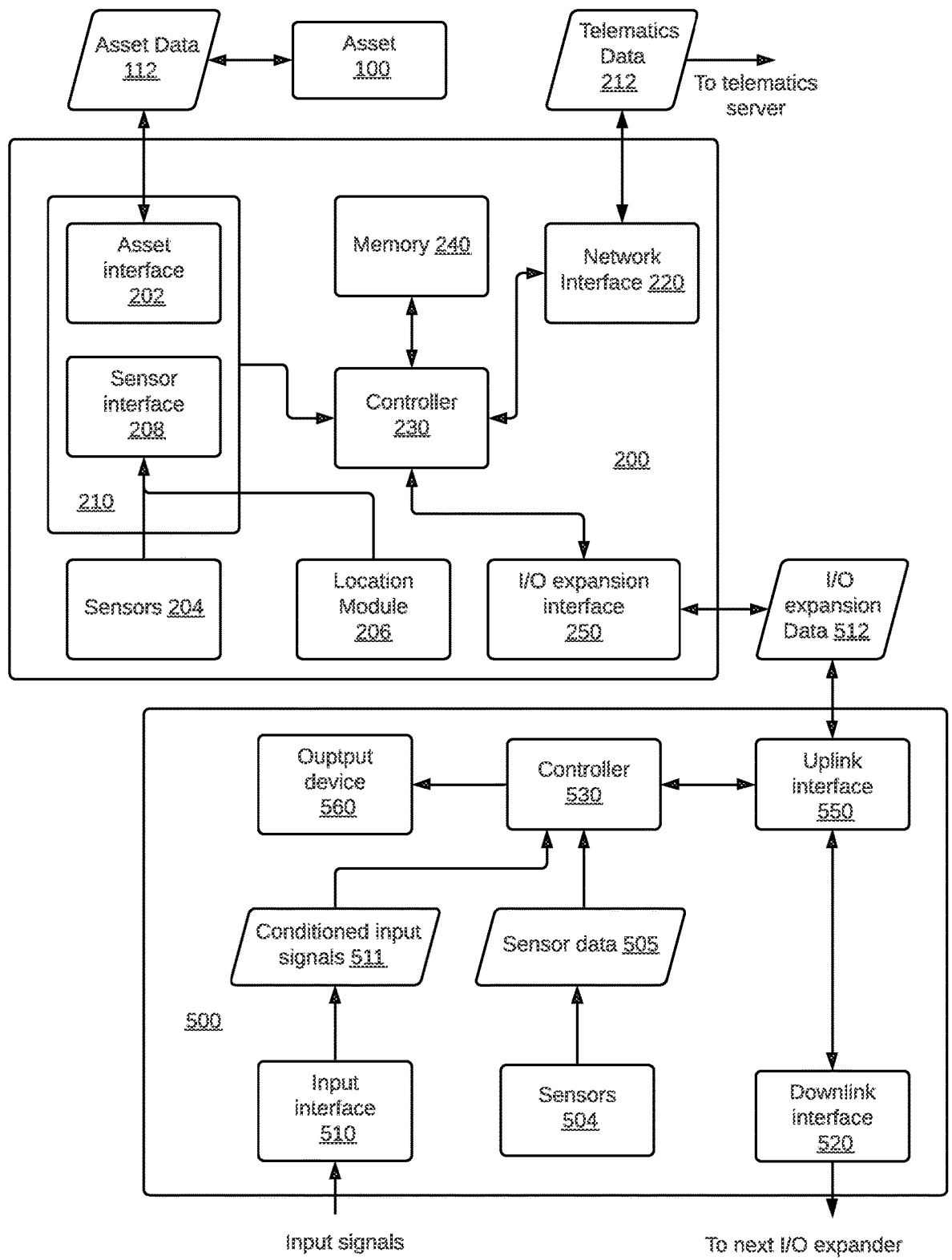
FIG. 3A is a block diagram showing an input/output (I/O) expander coupled to a telematics device, in accordance with embodiments of the present disclosure.

A generalized configuration for an I/O expander is described with reference to FIG. 3A. FIG. 3A depicts an asset 100, a telematics device 200 coupled to the asset, and an I/O expander 500 coupled to the telematics device 200. The asset 100 is similar to the asset of FIG. 2 and therefore the internal components thereof are not shown in FIG. 3A for simplicity. The telematics device 200 has a somewhat similar configuration as the telematics device 200 of FIG. 2 but adds an I/O expansion interface 250 for interfacing with the I/O expander 500. The I/O expansion interface 250 is coupled to the controller 230 and may be configured for exchanging I/O expansion data with the I/O expander 500.

Figure 3B:
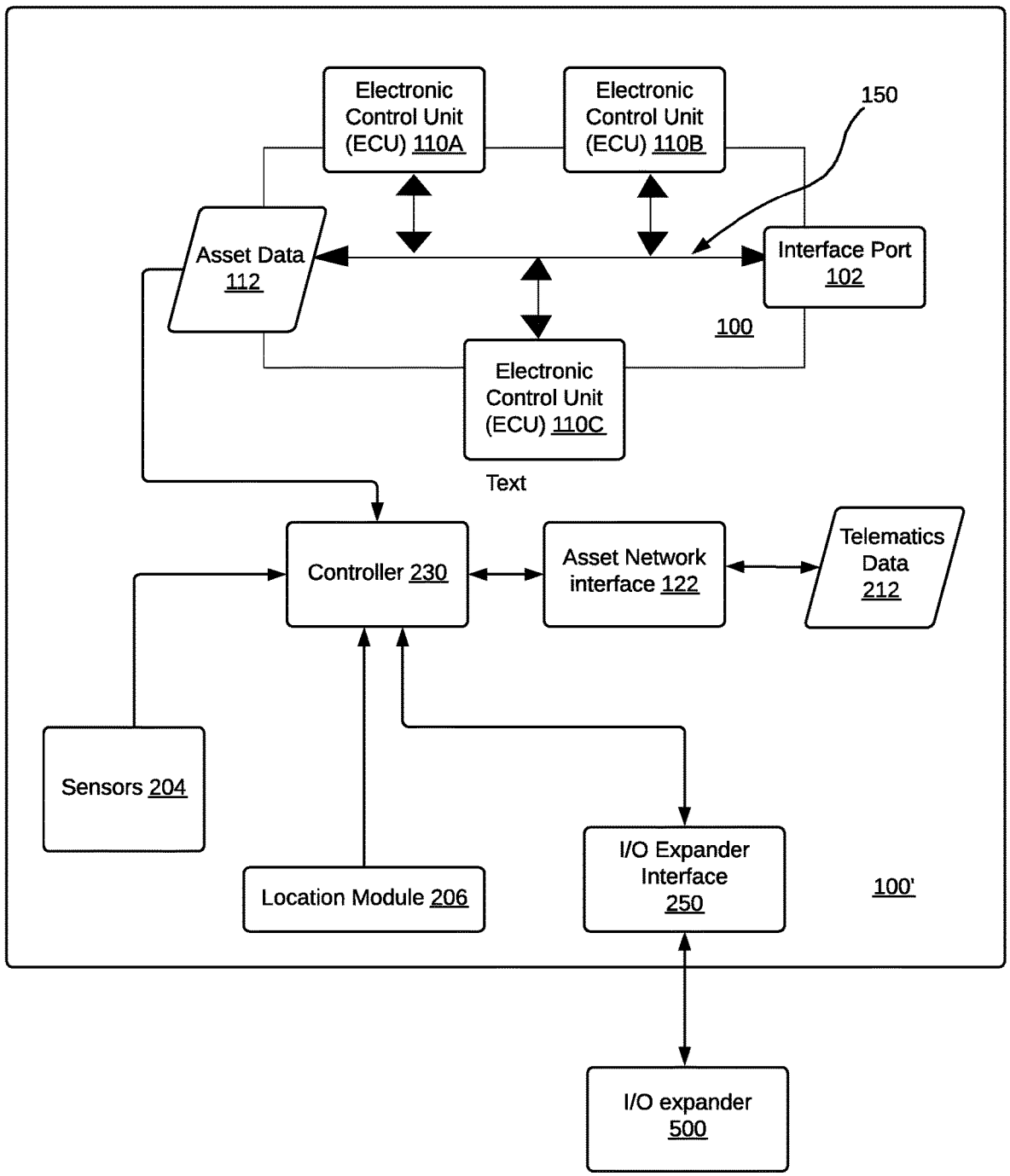
FIG. 3B is a block diagram showing a telematics device integrated into an asset, in accordance with embodiments of the present disclosure.

An input/output expansion (I/O expansion) device 500, which connects with the telematics device 200, varies in complexity depending on the purpose thereof. FIG. 3 shows an I/O expander 500 containing several components which may or may not all be present in other I/O expanders. For example, I/O expander 500 includes a controller 530, an input interface 510, an output device 560, sensors 504, an uplink interface 550 and a downlink interface 520.

The controller 530 may be similar to the controller 230 of FIG. 3. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data. The controller 530 may execute the machine-executable programming instructions stored in the persistent memory to carry out the functionality of the I/O expander 500.

The input interface 510 is an electronic peripheral, which receives external input signals, such as analog signals or proprietary signals from specialized machinery and provides conditioned input signals 511 in digital form to the controller 530 for further processing. The input interface 510 may have internal components which enable the input interface 510 to perform some conditioning to the input signals such as adjusting voltage levels, adjusting polarity, converting analog signals to digital signals, and converting alternating current (AC) signals to corresponding direct current (DC) signals.

The sensors 504 may sense or detect conditions pertaining to the asset 100 and may include types of sensors that are similar to or different from the sensors 204, which are part of the telematics device 200. The sensors 504 may include, but are not limited to, image sensors, optical sensors, gas sensors chemical sensors, and mechanical sensors. Image sensors may include digital camera, infrared cameras, or LiDAR (light detection and ranging) systems. The sensors 504 provide sensor data 505 such as numerical readings or digital images to the controller 530. In some embodiments (not shown), the sensor data 505 may be provided as input to the input interface 510 to undergo some conditioning before being provided as inputs to the controller 530. In further embodiments (not shown), the I/O expander 500 may have a dedicated signal conditioning module for conditioning the sensor data 505.

The output device 560 receives data from the controller 530 and performs an output function. For example, the output device 560 may include a display for displaying information received from the controller 530. As another example, the output device 560 may include a speech synthesizer and a speaker for displaying audible information received from the controller 530. As yet another example, the output device 560 may be an output interface to a hardware device. For example, the output device 560 may be a motor controller that interfaces to an electric motor.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expansion data 512. The uplink interface 550 is configured to use the same protocol and signaling as the I/O expansion interface 250 of the telematics device 200. Accordingly, the I/O expander 500 may exchange the I/O expansion data 512 with the telematics device 200. In some embodiments, the uplink interface 550 may also include power pins connected to corresponding power pins in the I/O expansion interface 250, thus allowing the I/O expander to be powered via the telematics device 200. In other embodiments (not shown), the I/O expander 500 may have its own power source instead of or in addition to the power provided by the telematics device 200 via the uplink interface 550.

The downlink interface 520 is an electronic peripheral interface coupled to the uplink interface 550. The downlink interface 520 is configured to interface with the uplink interface 550 of another I/O expander (as will be described below). Allowing the uplink interface 550 to connect to the downlink interface 520 of another I/O expander allows the daisy chaining of I/O expanders 500. Accordingly, I/O expansion data 512 received at the downlink interface 520 may be routed to the uplink interface 550. Additionally, power signals from the uplink interface 550 of the I/O expander 500 are coupled to power pins of the downlink interface 520. This allows the I/O expander 500 to power the next I/O expander connected thereto in a daisy chain of I/O expanders. For example, a telematics device 200 may provide power up to a number of I/O expanders 500. This is further described below.

The I/O expander 500 may be configured as an input expansion device, as an output expansion device or both as an input and an output device. Configured as input expansion device, the I/O expander 500 receives input signals at the input interface 510. The input interface 510 conditions the input signals and provides conditioned input signals 511 to the controller 530. Additionally, or alternatively the sensors 504 provide sensor data 505 to the controller 530.

The controller 530 may further process the conditioned input signals 511 and/or sensor data 505 to generate the I/O expansion data 512. The I/O expansion data 512 is in a format that can be consumed by the telematics device 200. The controller 530 configures the uplink interface 550 to send the I/O expansion data 512 to the telematics device 200 via the I/O expansion interface 250 of the telematics device 200.

Configured as an output expansion device, the I/O expander 500 receives I/O expansion data 512 from the telematics device 200 over the uplink interface 550. The controller 530 receives the I/O expansion data 512 from the uplink interface 550 and may perform further processing on the I/O expansion data 512. The controller 530 then sends the I/O expansion data 512 to the output device 560.

Integrated Telematics Device

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 3B, there is shown an asset 100' with the components of a telematics device integrated therein, in accordance with embodiments of the present disclosure. The asset 100' is similar to the asset 100 but, being a connected asset such as a connected car, it has an asset network interface 122 built into it. In the depicted embodiment, the controller 230 is directly connected to the asset communications bus, which is a CAN bus 150 and may directly obtain the asset data 112 therefrom. The sensors 204 and the location module 206 are also integrated into the asset 100 and provide the sensor data and the location data to the controller 230 as described above. The asset network interface 122 belongs to the asset 100' and may be used by the asset 100 to communicate with an original equipment manufacturer (OEM) server, to a roadside assistance server, or for other purposes. The controller 230 may utilize the asset network interface 122 for the transmission of telematics data 212 provided by the controller 230. In order to support gathering data types not provided by the integrated peripherals such as the sensors 204 and the location module 206, the asset 100' has an I/O expansion interface 250 coupled to the controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Daisy Chained I/O Expanders

In some embodiments, multiple I/O expanders 500 may be daisy chained. The I/O expanders 500 are typically daisy chained to provide additional functionality without having to include multiple I/O expansion interfaces 250 on the telematics device 200. Daisy chaining the multiple I/O expanders 500 is done by connecting the uplink interface 550 of one I/O expander to the downlink interface 520 of a preceding I/O expander 500. For example, with reference to FIG. 4, there is shown a system having an asset 100, a telematics device 200 coupled to the asset, a first I/O expander 500A connected to the telematics device 200, a second I/O expander 500B connected to the first I/O expander 500A, and an I/O expansion terminator 599 connected to the second I/O expander 500B.

The I/O expansion terminator 599 is a hardware component that indicates to an I/O expander 500 that no further I/O expanders are daisy chained thereto. The I/O expansion terminator 599 may be a peripheral device comprised of only passive components or may have electronic active components. The controller 530 of the I/O expander 500 connected to the I/O expansion terminator 599 does not forward any data to the downlink interface 520.

Figure 4:
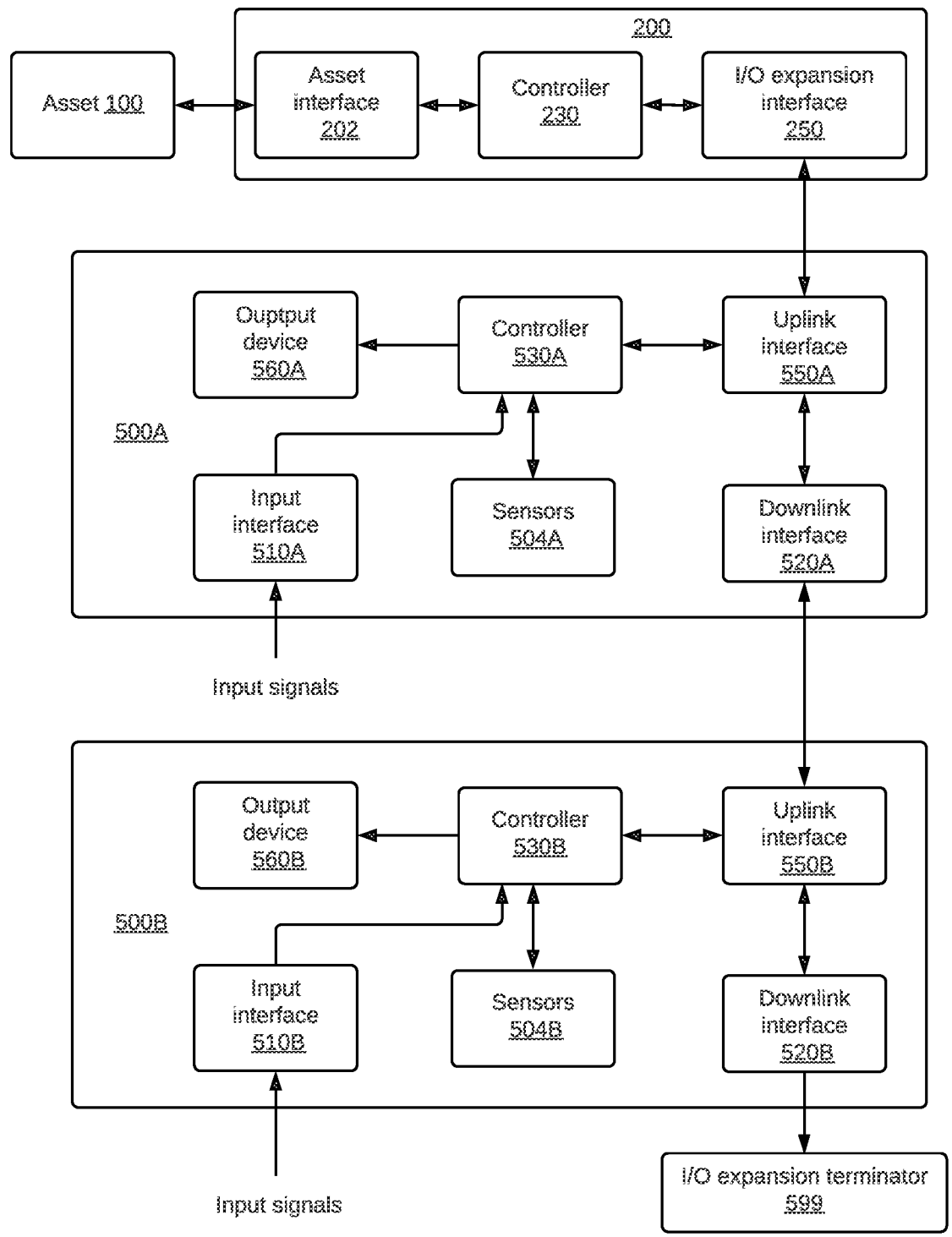
FIG. 4 is a block diagram showing a telematics device coupled to both an asset and to two daisy chained I/O expanders, in accordance with embodiments of the present disclosure.

Some of the components of some of the devices shown in FIG. 4 have been eliminated for the sake of simplicity. For example, the asset 100 is shown as a simple block, and only the asset interface 202, the controller 230 and the I/O expansion interface 250 of the telematics device 200 are shown. The first I/O expander 500A and the second I/O expander 500B are similar to the I/O expander 500 described above with reference to FIG. 3A and FIG. 3B. Accordingly, a description is not provided for any of the interfaces 510A and 510B, the controllers 530A and 530B, the sensors 504A and 504B, the outputs 560A and 560B, the uplink interfaces 550A and 550B, and the downlink interfaces 520A and 520B.

The I/O expansion interface 250 of the telematics device 200 is connected to the uplink interface 550A of the first I/O expander 500A. The downlink interface 520A of the first I/O expander 500A is connected to the uplink interface 550B of the second I/O expander 500B. The downlink interface 520B of the second I/O expander 500B is connected to the I/O expansion terminator 599. Each of the first I/O expander 500A and the second I/O expander 500B may be configured as an input device, an output device, or an input/output device.

Figure 5:
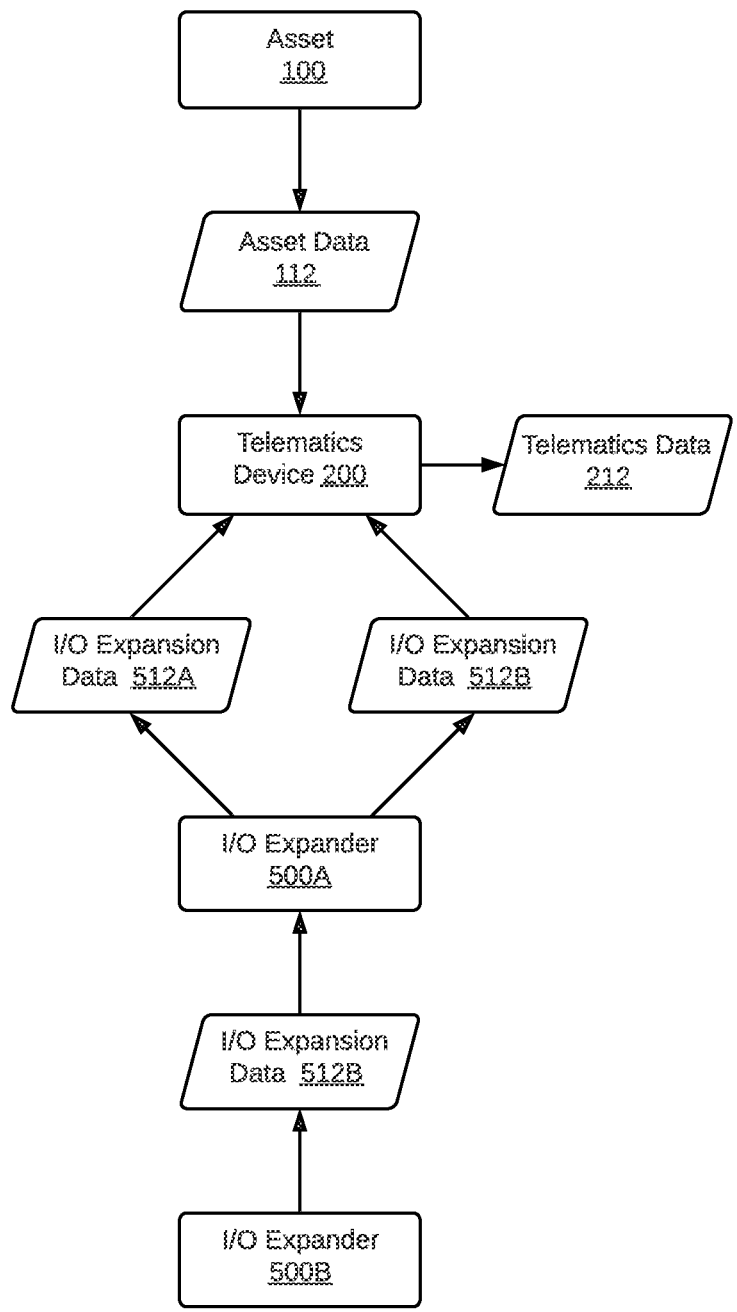
FIG. 5 is a block diagram showing the data flow from daisy chained I/O expanders to a telematics device, in accordance with embodiments of the present disclosure.

When two I/O expanders 500 are configured as input expansion devices, then I/O expansion data destined for a telematics device 200 may be combined. As an example, FIG. 5 depicts a system similar to that of FIG. 4, with emphasis on the flow of I/O expansion data between the first I/O expander 500A, the second I/O expander 500B, and the telematics device 200. The telematics device 200 is connected to an asset 100 and to the first I/O expander 500A. Additionally, the first I/O expander 500A and the second I/O expander 500B are daisy chained as described above with reference to FIG. 4.

In operation, the second I/O expander 500B sends its I/O expansion data 512B to the first I/O expander 500A. The first I/O expander 500A generally does not process the I/O expansion data 512B and simply passes that data through via the uplink interface 550A to the telematics device 200. Accordingly, the telematics device 200 receives both I/O expansion data 512A and I/O expansion data 512B from the first I/O expander 500A, as shown in the figure.

In some cases, the I/O expansion data 512 provided by an I/O expander 500 comprises raw I/O expansion data. As an example, one of the sensors in the I/O expander may be an image capture device such as a high-definition video camera. The high-definition video camera may provide video frames having a high resolution and/or a high frame rate. As another example, the I/O expander 500 may include audio capture devices such as a microphone, which produce a continuous stream of audio frames. Both video and audio frames are raw I/O expansion data 515 that need specialized processing to extract information therefrom.

Raw I/O expansion data may cause several problems with the telematics device 200 when attempting to process such data. Firstly, the raw I/O expansion data may be high bandwidth data, which is delivered at a high data rate. The I/O expansion interface 250 of the telematics device 200 may not be capable of receiving data at such a high data rate. Accordingly, the I/O expansion interface 250 may not be able to reliably receive the raw I/O expansion data. This may be true for both video and audio frames. Secondly, the memory 240 of the telematics device 200 may not have enough space for buffering the raw I/O expansion data, for processing by the controller 230. Thirdly, the memory 240 may also not contain machine-executable programming instructions suitable for processing the raw I/O expansion data. This is due to the many possibilities for interpreting the raw data. For example, video frames may be processed for the purpose of any one of: recognizing a driver, recognizing road conditions, and extracting information from a gauge in a vehicle's dashboard. The nature of the raw I/O expansion data thus requires specialized methods to interpret such data, such as artificial intelligence (AI). For example, image recognition of objects in video frames, or speech recognition (of voice commands, for example) in audio frames may best be performed using machine learning (ML) models, neural networks (NNs), or deep learning. It would be impractical for the memory 240 of the telematics device 200 to be pre-loaded with different methods, algorithms, or models for a variety of raw I/O expansion data. Finally, the controller 230 may not have enough processing power to process the raw I/O expansion data as the telematics device 200 is typically a simple and low-power device.

To address the problems associated with I/O expanders producing raw I/O expansion data, an AI-based I/O expansion adapter device ("I/O expansion adapter") is proposed. An I/O expansion adapter is an I/O expander that has specialized hardware and firmware which configure the I/O expansion adapter to consume the raw I/O expansion data produced by the I/O expanders and provide processed I/O expansion data to the telematics device. For example, the I/O expansion adapter may perform complex operations such as image recognition or voice recognition using specialized AI-based methods such as machine learning, neural networks, and deep learning. The output of an I/O expansion adapter is typically the result of such methods, such as identifying a person or an object in an image, recognizing a person's voice, or translating an audio message to a command for the telematics device.

Figure 6:
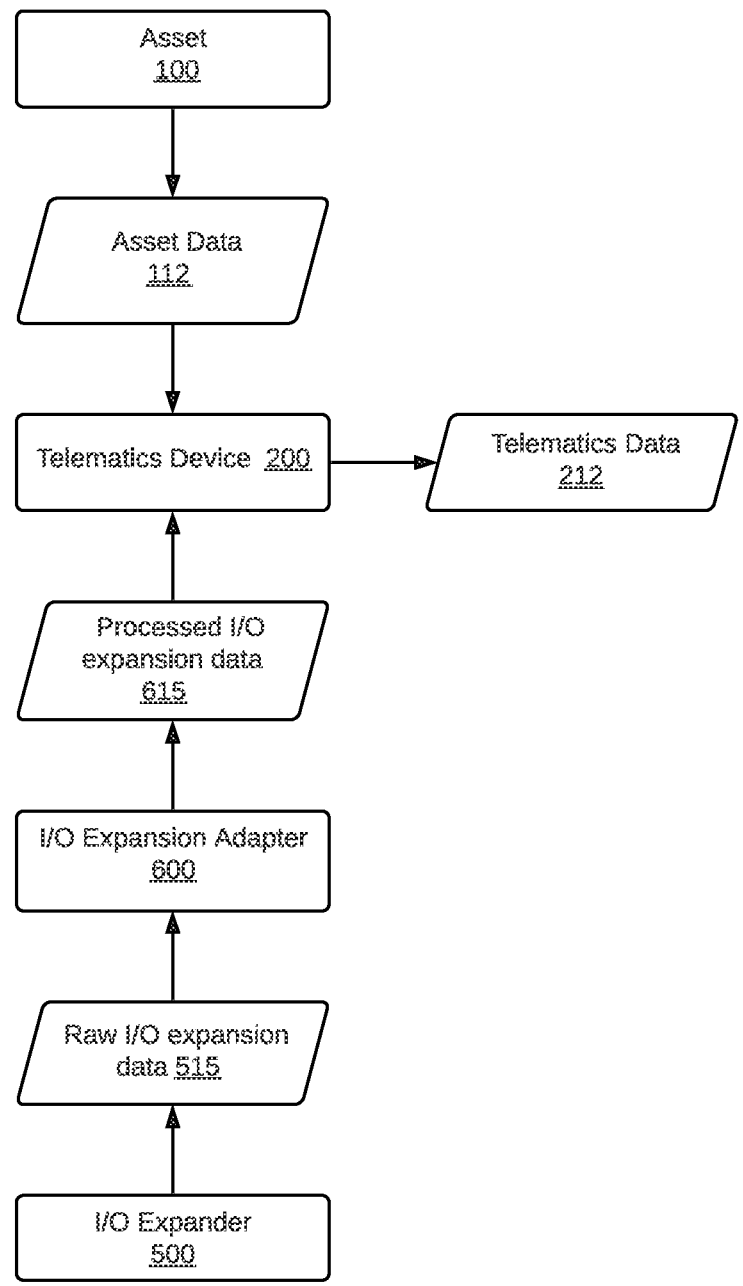
FIG. 6 is a block diagram showing an I/O expansion adapter device processing raw I/O expansion data provided by an I/O expander and providing processed I/O expansion data to a telematics device, in accordance with embodiments of the present disclosure.

With reference to FIG. 6, there is shown a telematics device 200 coupled to both an asset 100 and to an I/O expansion adapter 600, in accordance with embodiments of the present disclosure. The I/O expander 500 is, in turn, coupled to the I/O expansion adapter 600. It may be considered that the I/O expansion adapter 600 and the I/O expander 500 are connected as two daisy chained I/O expanders. There are, however, some differences. In a typical daisy-chained arrangement, such as the one referred to in FIGS. 4 and 5, the multiple I/O expanders are independent devices and are connected through similar uplink and downlink interfaces. For example, the first I/O expander 500A and the second I/O expander 500B may contain different hardware and/or perform entirely different functions. As shown in FIG. 5, the first I/O expander 500A merely passes the I/O expansion data 512B from the second I/O expander 500B to the telematics device 200. In the case of the I/O expander 500 and the I/O expansion adapter 600, the relationship therebetween the two is more involved. For starters the I/O expander 500 and the I/O expansion adapter 600 are connected via their high-speed interfaces. The I/O expander 500 produces raw I/O expansion data 515. The raw I/O expansion data 515 may be in the form of high bandwidth data such as video frames or audio frames or may be any other type of data requiring specialized processing. The raw I/O expansion data 515 is provided to the I/O expansion adapter 600. The I/O expansion adapter 600 consumes the raw I/O expansion data 515 and produces processed I/O expansion data 615 which is then provided to the telematics device 200. The telematics device 200 can process the processed I/O expansion data 615 as it is comprised of information in a standard format, is smaller in size, or is less complex than the raw I/O expansion data 515. For example, if the raw I/O expansion data 515 comprises video frames of the vehicle's dashboard, the processed I/O expansion data 615 may comprise odometer readings, engine temperature, or oil pressure. In some embodiments, the processed I/O expansion data 615 is provided in the same format as the asset data 112 and therefore can be readily processed by the telematics device 200.

The processed I/O expansion data 615 is often smaller in size than the raw I/O expansion data 515. Accordingly, transferring the processed I/O expansion data 615 between the I/O expansion adapter 600 and the telematics device 200 can be done over a simple, low-speed connection. Interpreting the processed I/O expansion data 615, which may comprise either information or commands to the telematics device 200 is advantageously simple and does not require a large amount of memory or high processing power at the telematics device 200. The telematics device 200 may produce telematics data 212 based on at least one or more of: the asset data 112, the sensor data 205 from the sensors 204, the location data 207 from the location module 206, and the processed I/O expansion data 615 provided by the I/O expansion adapter 600.

Figure 7A:
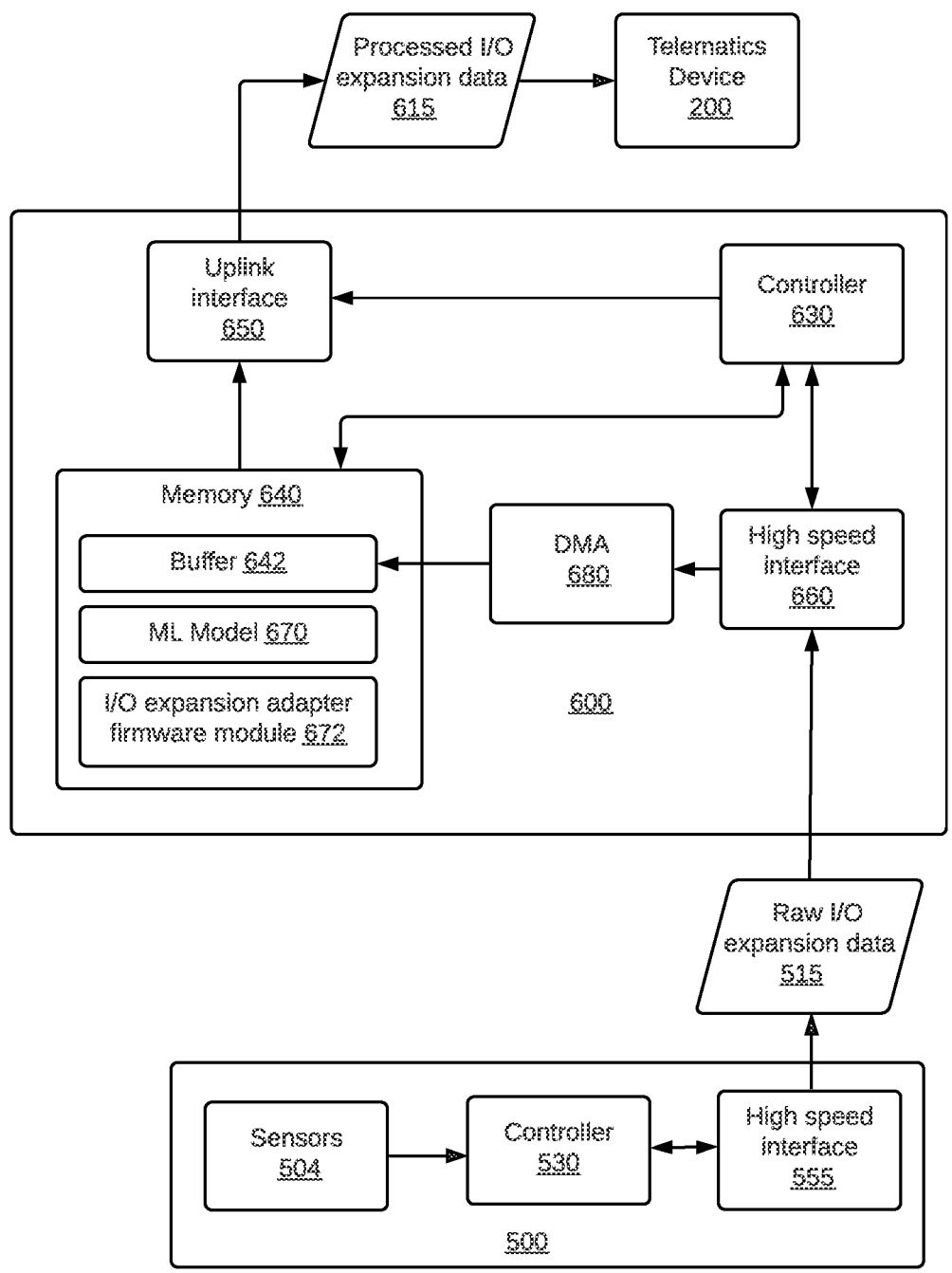
FIG. 7A is a block diagram showing the internal components of an I/O expansion adapter coupled to an I/O expander and a telematics device, in accordance with embodiments of the present disclosure.
Figure 7B:
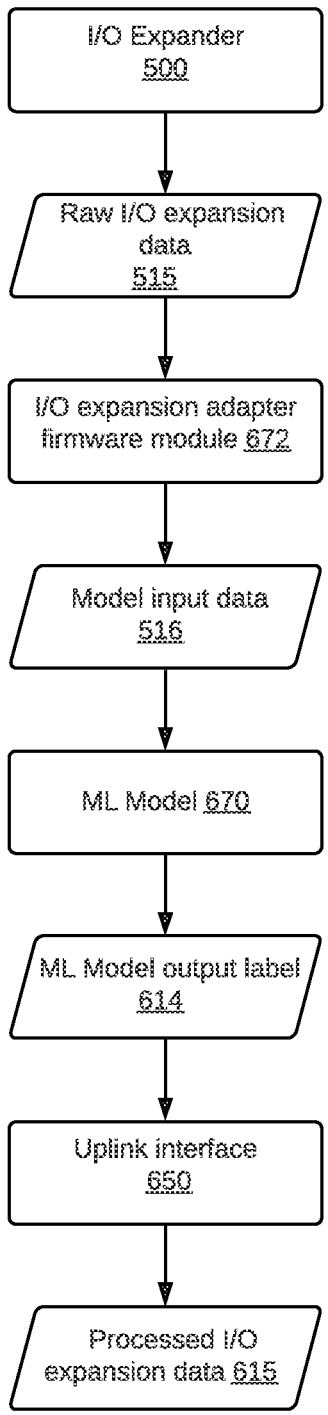
FIG. 7B is a diagram showing the steps of processing the raw I/O expansion data into processed I/O expansion data by the components of the I/O expansion adapter, in accordance with embodiments of the present disclosure.

The I/O expansion adapter 600 may have several possible configurations. FIG. 7A shows an example configuration of an I/O expansion adapter 600, in accordance with embodiments of the present disclosure. FIG. 7B shows the data flow between the various modules of FIG. 7B. With reference to both FIGS. 7A and 7B, the I/O expansion adapter 600 is coupled with an I/O expander 500 that produces raw I/O expansion data 515 and with a telematics device 200 that consumes the processed I/O expansion data 615 produced by the I/O expansion adapter 600.

The telematics device 200 has been described above and is depicted as a simple block in the figure.

The I/O expander 500 is also shown as a simplified device having a controller 530, sensors 504 and a high-speed interface 555. The controller 530 and sensors 504 have been described above. For example, the sensors 504 may be image capture devices and/or audio capture devices that produce video and/or audio frames, respectively. The high-speed interface 555 is an I/O peripheral that permits data transfer at a high rate. In some embodiments, the high-speed interface 555 is a wired interface including, but not limited to, universal serial bus (USB), IEEE 1394 ("Firewire"), Ethernet, optical communications, and the like. In other embodiments, the high-speed interface 555 is a wireless communications peripheral such as a Wi-Fi transceiver, a Bluetooth transceiver, and the like. The sensors 504 may produce raw data such as video or audio frames. The controller 530 may package the raw data as raw I/O expansion data 515 and send them out the high-speed interface 555.

The I/O expansion adapter 600 comprises a controller 630, a memory 640, a Direct Memory Access (DMA) controller 680, an uplink interface 650 and a high-speed interface 660.

The controller 630 is similar to the controllers 230 and 530 described above. The controller 630 may execute machine-executable programming instructions stored in the memory 640, as described below.

The DMA controller 680 is a data transfer module which moves I/O data in and out of memory. The DMA controller 680 may be configured to receive the raw I/O expansion data 515 from the high-speed interface 660 and buffer the raw I/O expansion data 515 in the buffer 642. Buffering the raw I/O expansion data 515 involves temporarily storing the raw I/O expansion data 515 for processing by the controller 630. In some embodiments, the controller 630 may buffer the raw I/O expansion data 515 into the buffer 642. It is, however, more efficient to delegate the buffering to the DMA controller 680 when the size of the portion of raw I/O expansion data 515 is large. Delegating the buffering step to the DMA controller 680 enables the controller 630 to perform other tasks while the DMA controller 680 is buffering the raw I/O expansion data 515. As an example, if the raw I/O expansion data 515 is a video feed, the DMA controller 680 may be buffering a one video frame, while concurrently the controller 630 may be processing another video frame that was previously buffered in the buffer 642. Advantageously, this improves the efficiency and throughput of the I/O expansion adapter 600.

The memory 640 includes a buffer 642, and stores machine-executable instructions for both an I/O expansion adapter firmware module 672 and a machine learning (ML) model 670.

The buffer 642 is a region of the memory 640 set aside for receiving at least a portion of the raw I/O expansion data 515. For example, if the raw I/O expansion data 515 comprises video frames, the buffer 642 may be sized to store at least one video frame. If the raw I/O expansion data 515 comprises audio frames, the buffer 642 may be sized to store at least one audio frame. In some embodiments, the controller 630 may process the raw I/O expansion data 515 on-the-fly as the raw I/O expansion data 515 is received from the high-speed interface 660, in which case the memory 640 may not have a buffer space (such as the buffer 642) allocated therein.

The I/O expansion adapter firmware module 672 includes machine-executable programming instructions which, when executed by the controller 630, may direct the DMA controller to transfer the raw I/O expansion data 515 to the buffer 642. The machine-executable programming instructions of the I/O expansion adapter firmware module 672 may also perform the step of extracting model input data 516 from the raw I/O expansion data 515. For example, the ML model 670 may be configured to recognize an odometer reading or road conditions in an image. The I/O expansion adapter firmware module 672 may receive raw I/O expansion data 515 in the form of a video frame or an image of a vehicle's dashboard. The I/O expansion adapter firmware module 672 may identify the region of the video frame containing the odometer reading, extract that region and perform some further processing such that it produces model input data 516 that can be used by the ML model 670. The I/O expansion adapter firmware module 672 may also include machine-executable programming instructions which, when executed by the controller 630, direct the model input data 516 to the ML model 670 for processing. The I/O expansion adapter firmware module 672 may also include machine-executable programming instructions for directing the processed I/O expansion data 615 to the uplink interface 650. The I/O expansion adapter firmware module 672 may configure the I/O expansion adapter 600 to communicate with a telematics server 300 and download updated versions of the ML model 670, as will be described below.

The ML model 670 processes the model input data 516 and produces processed I/O expansion data 615. In some embodiments, the model input data may comprise raw I/O expansion data 515, such as images or video frames. In other embodiments, the model input data 516 may comprise features extracted from the raw I/O expansion data 515. For example, the ML model 670 may be configured for determining an odometer reading based on model input data 516 extracted from raw I/O expansion data 515, such as an image or a video frame. In this case, the model input data 516 comprises features in the form of an odometer portion of a dashboard image. The ML model 670 produces a predicted output known as a label, shown as ML model output label 614. In the case of the odometer reading, the output label of the ML model 670 is a predicted odometer reading. The ML model output label 614 of the ML model 670 is packaged by the I/O expansion adapter firmware module 672 and output by the I/O expansion adapter 600 as processed I/O expansion data 615.

The high-speed interface 660 is an I/O peripheral configured to receive the raw I/O expansion data 515. The high-speed interface 660 may use wired or wireless technology and is similar to the high-speed interface 555 discussed above and uses the same protocol. Accordingly, the high-speed interface 660 may receive raw I/O expansion data 515 from the I/O expander 500. The high-speed interface 660 is connected to both the controller 630 and the DMA controller 680.

The uplink interface 650 is an I/O peripheral similar to the uplink interface 550 of the I/O expander of FIG. 4. The uplink interface 650 is configured to communicate with the I/O expansion interface 250 of a telematics device 200 for transferring the processed I/O expansion data 615 to the telematics device 200.

In operation, the sensors 504 of the I/O expander 500 capture raw I/O expansion data 515 and the controller 530 sends that raw I/O expansion data 515 out of the I/O expander 500 via the high-speed interface 555. The I/O expansion adapter 600 receives the raw I/O expansion data 515, via the high-speed interface 660. The high-speed interface 660 may signal the controller 630 that raw I/O expansion data 515 has been received. The controller 630 executes the I/O expansion adapter firmware module 672 machine-executable programming instructions, which direct the DMA controller 680 to transfer the raw I/O expansion data 515 from the high-speed interface 660 to the buffer 642 in the memory 640. The I/O expansion adapter firmware module 672 obtains the model input data 516 from the raw I/O expansion data 515. As discussed above, in some embodiments the I/O expansion adapter firmware module 672 may extract portions of a digital image (such as a video frame) and perform some preliminary processing to obtain model input data 516. In other embodiments, the model input data 516 comprises the raw I/O expansion data. The I/O expansion adapter firmware module 672 may further direct the ML model 670 to process the model input data 516. The ML model 670 may process the model input data 516 and provide an ML model output label 614. For example, if the model input data 516 was an odometer portion of a dashboard image, the ML model 670 may determine an odometer reading value and output that as the ML model output label 614. The I/O expansion adapter firmware module 672 may package the ML model output label 614 into a protocol frame and send it out as processed I/O expansion data 615 via the uplink interface 650. The processed I/O expansion data 615 is received by the telematics device 200 as described above.

Figure 8A:
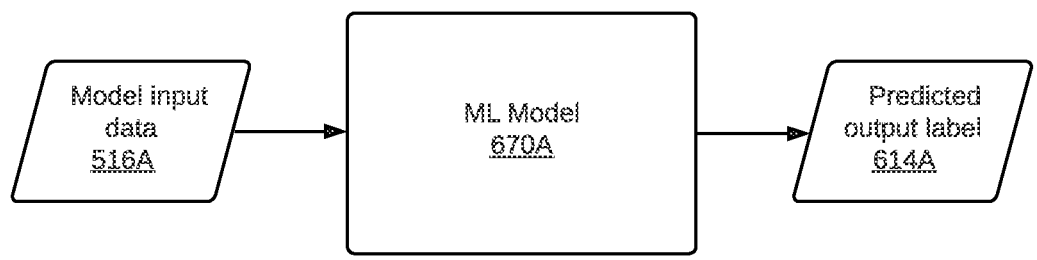
FIG. 8A is a simplified block diagram of an example machine-learning (ML) model for determining a vehicle asset's odometer reading based on model input data, in accordance with embodiments of the present disclosure.

An ML model can predict an output label based on features, which are input to the model. In order to train the ML model to make an accurate prediction of an output label, the model is provided with training data. The training data is a dataset comprised of sample output data and the corresponding set of (model) input data that have an influence on the output. Since the output data (also referred to as "output label") is known for the model input data, running the input data through the model's algorithm allows correlating the processed output against the sample output data. The result from this correlation is to modify the model's algorithm to improve the accuracy of the prediction of the model output label. FIG. 8A shows an example for an ML model 670A that determines a predicted output label 614A based on model input data 516A. Model input data 516A are provided to the ML model 670A, and the model determines the predicted output label 614A. For example, the ML model 670A may determine a predicted output label 614A which may be a vehicle parameter such as an odometer reading for a vehicle asset based on model input data 516A. The model input data 516A may be a portion of a dashboard image specific containing an odometer image portion, after some preliminary processing. For example, the model input data 516A may be a plurality of pixels representing the outline of the digits of the odometer image portion. The model input data 516A is unlabeled data as the corresponding output label (the odometer reading) is not known. The ML model 670A processes the model input data 516A and determines the predicted output label 614A with some degree of certainty. In the case of the odometer reading, the predicted output label 614A is the predicted odometer reading. The ML model 670A is useful for use when the corresponding I/O expansion adapter is deployed in a vehicle asset that does not report an odometer reading through the interface port thereof.

Figure 8B:
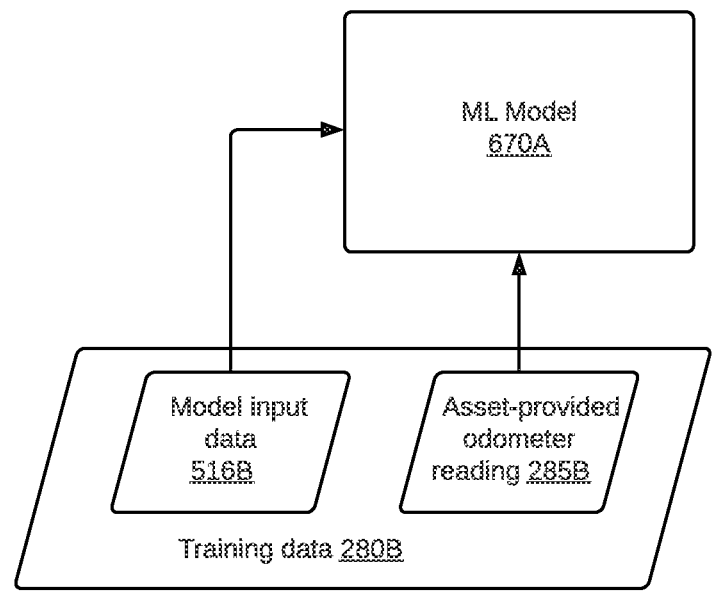
FIG. 8B is a simplified block diagram showing the training of the ML model of FIG. 8A using training data, in accordance with embodiments of the present disclosure.

In order to train the ML model 670A, a set of known inputs and corresponding outputs need to be fed to the model. The set of known inputs for which the output is known is referred to as labelled data. Training data and labelled data are used synonymously in this disclosure. FIG. 8B shows an example of training the ML model 670A to recognize a vehicle parameter shown on a gauge of the vehicle's dashboard such as an odometer reading, using training data 280B. For example, in the case of the odometer reading, training data 280B is comprised of a model input data 516B, in the form of odometer images taken from an asset and an odometer reading 285B provided over the interface port of the same asset. Taking the odometer reading 285B to be the expected output label that corresponds to the model input data 516B, the ML model 670A can be trained to accurately determine the odometer reading based on the model input data 516A. The training process may be repeated with training data from different assets deployed in the system.

While the aforementioned systems have been described in relation to an application for identifying an odometer reading from dashboard images, other examples are also possible. For example, it may be desired to determine whether a driver is wearing a driver seatbelt or not. While some vehicles have sensors in the seatbelts and can determine whether the driver's seatbelt is fastened, other vehicles may not provide that information through their interface port. Accordingly, images of the vehicle's driver, captured by an image-capturing device such as a driver-facing dashboard camera, may be used in conjunction with an I/O expansion adapter and an I/O expander to determine whether the driver is wearing a seatbelt. An ML model for determining whether a driver is wearing a seatbelt based on captured images of the driver, can be trained using training data. The training data includes images captured by a driver-facing dashboard camera on vehicles which report whether a seatbelt is buckled, along with the corresponding status of the seatbelt at the time the images were captured. Once an ML model is trained using the training data, it may be used to predict whether a driver is wearing a seatbelt based on the captured images of the driver from a driver-facing dashboard camera.

In some cases, it is advantageous to further train an ML model, such as the ML model 670, after being deployed in the field. In a telematics system in which several assets are deployed, some of the assets may provide training data, through their telematics devices. The provided training data be used to train the ML models deployed in the I/O expansion adapters coupled to telematics devices of other assets. With reference to the aforementioned odometer reading example, many vehicles provide their odometer readings as part of the asset data available via the vehicle's interface port. Some of those vehicles may have a camera directed at the dashboard for capturing other information (such as engine temperature and/or oil pressure). Such assets can, through their I/O expander and telematics devices, provide training data in the form of both dashboard images and known odometer readings to a remote server. The remote server, such as the telematics server, may train a centralized ML model based on the training data, then push an update to the ML model deployed on I/O expansion adapters deployed in the field.

Advantageously, the ML model deployed on an I/O expansion adapter in the field may be enhanced by additional training.

Figure 9A:
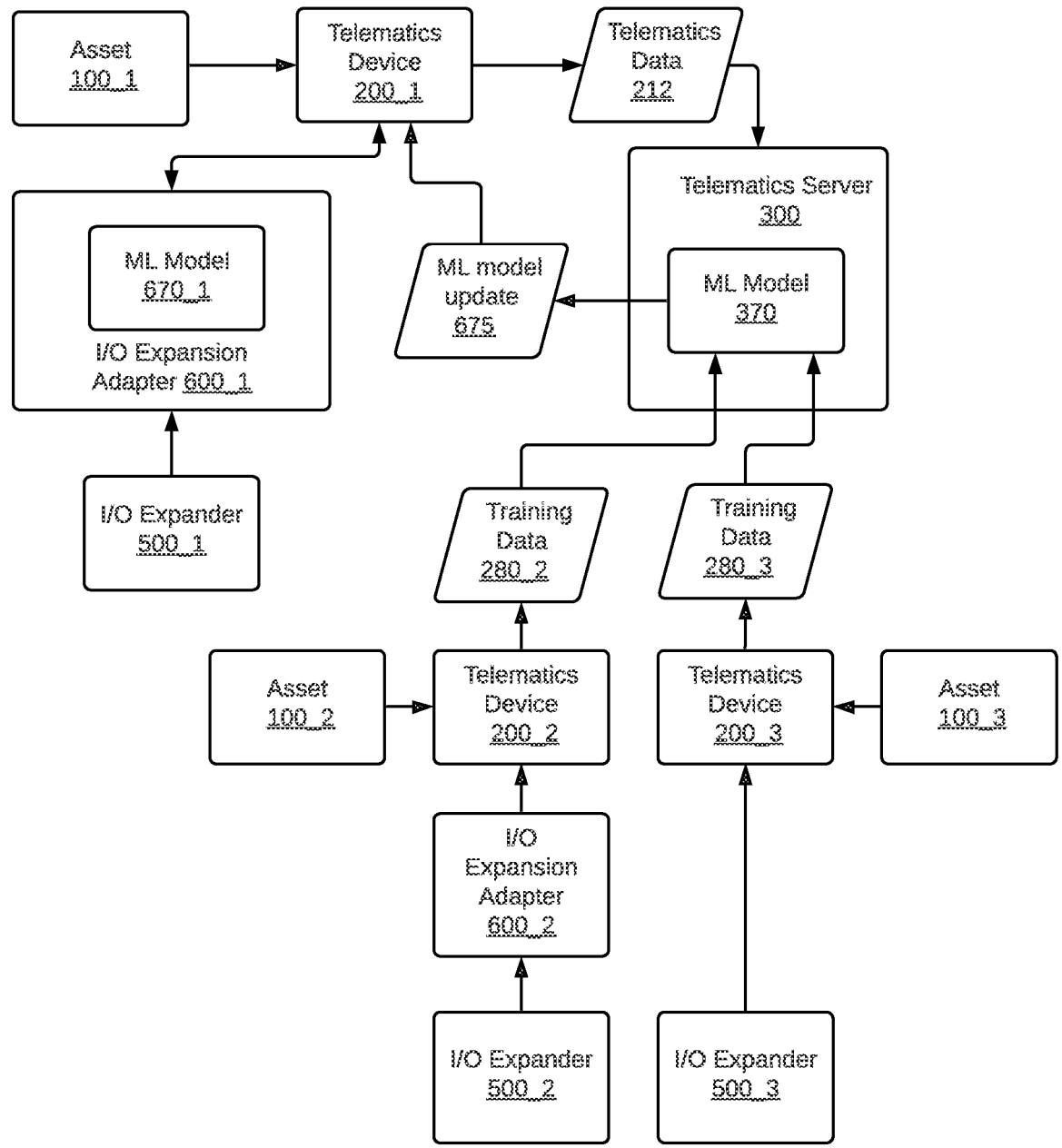
FIG. 9A is a block diagram of a system for updating an ML model on an I/O expansion adapter based on a centralized ML model, in accordance with embodiments of the present disclosure.

FIG. 9A depicts an example system in which training data provided by two assets may be used to update a centralized ML model, that is then sent as an update to an ML model associated with a third asset. The depicted system may have hundreds of assets, telematics devices, I/O expanders and I/O expansion adapters, but only 3 assets are shown for simplicity. Specifically, FIG. 9A depicts a telematics system that includes a telematics server 300, and in which three assets 100_1, 100_2 and 100_3 are deployed. Each of the three assets is connected to a corresponding telematics device. The asset 100_1 is connected to a telematics device 200_1, the asset 100_2 is connected to a telematics device 200_2, and the asset 100_2 is connected to a telematics device 200_3. The telematics device 200_1 is connected to both the asset 100_1 and an I/O expansion adapter 600_1, which in turn is connected to an I/O expander 500_1. The I/O expansion adapter 600_1 is running an ML model 670_1 for processing model input data based on I/O expansion data provided by the I/O expander 500_1. The telematics device 200_2 is connected to an I/O expansion adapter 600_2, which in turn is connected to an I/O expander 500_2. The telematics device 200_3 is connected to I/O expander 500_3. The telematics device 200_1, the telematics device 200_2, and the telematics device 200_3 are all in communication with the telematics server 300. The I/O expansion adapter 600_1 communicates with the telematics server 300 via the telematics device 200_1.

The system of FIG. 9A may be used to update the ML model 670_1 based on a centralized ML model 370 residing on the telematics server 300. The centralized ML model 370 can, in turn, be trained using training data 280_2 and 280_3 provided by the telematics device 200_2 and the telematics device 200_3. As an example, considering the odometer reading example discussed above with reference to FIG. 8A and FIG. 8B, the steps of training the centralized ML model 370 and updating the ML model 670_1 are detailed below.

The I/O expansion adapter 600_1 is running the ML model 670_1. The I/O expander 500_1 may provide images of the dashboard of the asset 100_1 to the I/O expansion adapter 600_1. The I/O expansion adapter firmware of the I/O expansion adapter 600_1 processes the images and generates model input data. The ML model 670_1 determines an output label comprising an odometer reading for the asset 100_1 with some degree of certainty. If the ML model 670_1 is not well-trained, the degree of certainty of the determined odometer reading is relatively low. In order to enhance the certainty of the determination of the odometer reading of the ML model 670_1, an ML model update 675 can be sent by the telematics server 300 to the I/O expansion adapter 600_1. The ML update 675 comprises an update ML model which had been trained on the telematics server 300 based on training data provided by other telematics devices such as telematics device 200_2 and telematics device 200_3 as detailed below.

The training of the centralized ML model 370 is done using training data 280_2 and training data 280_3 sent to the telematics server 300 by the telematics device 200_2 and the telematics device 200_3, respectively. With reference to telematics device 200_2, the asset 100_2 may provide odometer readings as part of the asset data it provides to the telematics device 200_2. However, the I/O expander 500_2 may still capture video frames of the dashboard of the asset 100_2 in order to obtain other data, which is not provided by the asset 100_2 through its interface port. The I/O expansion adapter 600_2 processes the video frames from the I/O expander 500_2 and may provide the other data such as fuel level, fuel consumption, or engine temperature to the telematics device 200_2. Additionally, the I/O expansion adapter 600_2, may process the dashboard video frames and provide model input data corresponding to the odometer portion of the dashboard video frames. The telematics device 200_2 may combine the model input data corresponding to the odometer portion of the dashboard images with the actual odometer readings from the asset 100_2, to obtain labelled data, depicted as training data 280_2. The training data 280_2 is thus similar to the training data 280B of FIG. 8B in that it includes input data (features) and the known output label. The centralized ML model 370 may also accept training data including raw data. For example, the I/O expander 500_3 may provide raw video frames (images) of a vehicle's dashboard along with the odometer reading as part of the asset data captured from the asset 100_3 to the telematics device 200_3. The telematics device 200_3 sends the captured images and the odometer reading as training data 280_3 to the telematics server 300 so that it may be used to train the centralized ML model 370.

While in the above example, the training data 280_2 and 280_3 was sent to the telematics server 300 by the telematics devices 200_2 and 200_3, respectively, this is not necessarily the case. In another embodiment, part of the training data may be sent directly from an I/O expansion adapter 600 to the telematics server 300, while the other part of the training data may be sent to the telematics server 300 by the telematics device 200. For example, the known output label, which is obtained by the telematics device from the corresponding asset is sent to the telematics server by the telematics device, while some of the inputs correlated with that known output may be sent directly by an I/O expansion adapter. The telematics server uses the known output label and the corresponding model inputs to train the centralized ML model 370. The known output label and the corresponding model inputs are tagged with a common identifier so that the telematics server 300 may correlate them to arrive at training data for the centralized ML model. For example, the I/O expansion adapter 600_2 may send model input data to the telematics server 300 over a network interface thereof (not shown), or over a network interface of the I/O expander 500_2. In this case, the telematics device 200_2 may send corresponding odometer readings through its own network interface, to the telematics server 300. In such embodiments, the dashboard images and the odometer readings are tagged with a common identifier so that the telematics server 300 may correlate the dashboard images and odometer readings to obtain the training data 280_2, which the telematics server 300 uses to train the centralized ML model 370. The common identifier may be an asset identifier unique to the asset associated with the telematics device. For example, the asset identifier may be a vehicle identifier number (VIN), if the asset is a vehicular asset. The telematics device 200_3 may also obtain odometer readings from the asset 100_3, tag that reading with the asset identifier of the asset 100_3 and send the odometer reading to the telematics server 300.

The telematics server 300 receives training data from a plurality of telematics devices, such as the training data 280_2 and 280_3 provided by the telematics devices 200_2 and 200_3. In the depicted embodiment, the telematics server 300 trains the centralized ML model 370 using the training data 280_2 and 280_3. The telematics server 300 sends an ML model update 675, including an updated ML model, to the I/O expansion adapter 600_1. In some embodiments, the telematics server 300 sends the ML model update 675 to the telematics device 200_1 which in turn downloads the ML model update 675 to the I/O expansion adapter 600_1. In other embodiments, the I/O expansion adapter 600_1 includes a network interface and is able to receive the ML model update 675 from the telematics server 300 over a network such as the network 50.

In some embodiments, the telematics server 300 periodically sends an updated ML model to the I/O expansion adapter 600_1 and other I/O expansion adapters running the same ML model, such as I/O expansion adapter 600_2, for example. In another example, the telematics server 300 sends an ML model update 675 in response to receiving an ML update request from an I/O expansion adapter 600. In this case, the I/O expansion adapter 600 may send an ML update request at a time when it is not capturing data, such as when a vehicle is idle. Advantageously, the ML model 670_1 can be updated without any disruption to the operation of the telematics device 200_1.

In yet another example, the telematics server 300 sends an ML update to the I/O expansion adapters 600 deployed in the field when the output label prediction is significantly improved. For example, when the output label prediction certainty of the centralized ML model 370 increases by a particular percentage increase which is greater than an output label prediction increase threshold, the telematics server 300 may send an ML model update 675 to the I/O expansion adapters 600 deployed in the field. If, however, the output label prediction certainty of the centralized ML model 370 is only increased by 1%, the telematics server 300 may refrain from sending an ML model update 675 until an additional increase in output label prediction certainty is achieved. For example, when the telematics server 300 receives the training data 280_2 which includes both model input data and a known output label, the telematics server trains the centralized ML model 370. The telematics server then uses the centralized ML model 370 to predict the output label based on the model input data. The predicted output label is compared with the known output label. The output label prediction certainty is computed based on the comparison between the predicted output label and the known output label. The computed output label prediction certainty is compared with a prior machine-learning model predicted output label certainty to determine an increase in the output prediction certainty over the prior predicted output label certainty. The prior predicted output label represents the predicted output label of the previously sent ML model update 675. The predicted output label certainty of the previously sent ML model update is the predicted output label certainty of the centralized ML model 370 at the time the last ML model update 675 was sent out to I/O adapters deployed in the field. For example, if the prior predicted output label certainty was 75% and the newly computed predicted output label certainty is 78%, then the increase in output label prediction certainty is 3%. If the telematics server 300 defines the prediction output label increase threshold to be 5%, then no ML model update 75 is sent in response to training the centralized ML model 370 with the training data 280_2. The telematics server 300 may further receive the training data 280_3, for example from the telematics device 200_3. The training data 280_3 comprises model input data and corresponding known output labels. The telematics server 300 further trains the centralized ML model 370 using the model input data and the known output labels of the training data 280_3. The telematics server 300 then uses the centralized ML model 370 to predict the output label based on the model input data of the training data 280_2. The predicted output label certainty is computed as described above. The difference between the computed output label certainty and the prior output label certainty is computed as well. For example, if the new output label certainty is 81% and the prior output label certainty is 75% then the increase in output label certainty is 6%. Assuming the output label prediction increase threshold is 5%, the increase in output label certainty exceeds that output label increase threshold. In response to determining that the predicted output label certainty increase is greater than the prediction output label increase threshold, the telematics server 300 sends an ML model update 675 to I/O expansion adapters such as I/O expansion adapters 600_1. For example, the telematics server 300 may send an ML model update 675 to the telematics device 200_1. The telematics device 200_1 in turn passes the received ML model update 675 to the I/O expansion adapter 600_1 to replace the ML model 670 stored thereon.

Advantageously, optimizing the process of sending an ML model update 675 so that the ML model update 675 is only sent when it enhances the output label prediction on a deployed I/O expansion adapter reduces unnecessary network traffic between the telematics server 300 and the I/O expansion adapters 600 deployed in the field. Additionally, the process of updating an ML model 670 on an I/O expansion adapter 600 may require a restart of the I/O expansion adapter 600, which renders the I/O expansion adapter 600 inoperable while it is being restarted and while the ML model 670 thereof is being updated. Accordingly, it is advantageous to only update the ML model 670 on an I/O expansion adapter 600 if significant improvements in the output label prediction certainty of the ML model 670 can be achieved by the update.

The approach described above with reference to FIG. 9A requires centralizing the training data in a datacenter or on a machine such as the telematics server 300. Another approach which averts the need to share training data from different I/O expansion adapters with a server may utilize Federated Learning. Federated Learning enables devices, such as I/O expansion adapters, to collaboratively learn a shared prediction model while keeping all the training data on device. This decouples the ability to do machine learning from the need to store the training data on the cloud.

Figure 9B:
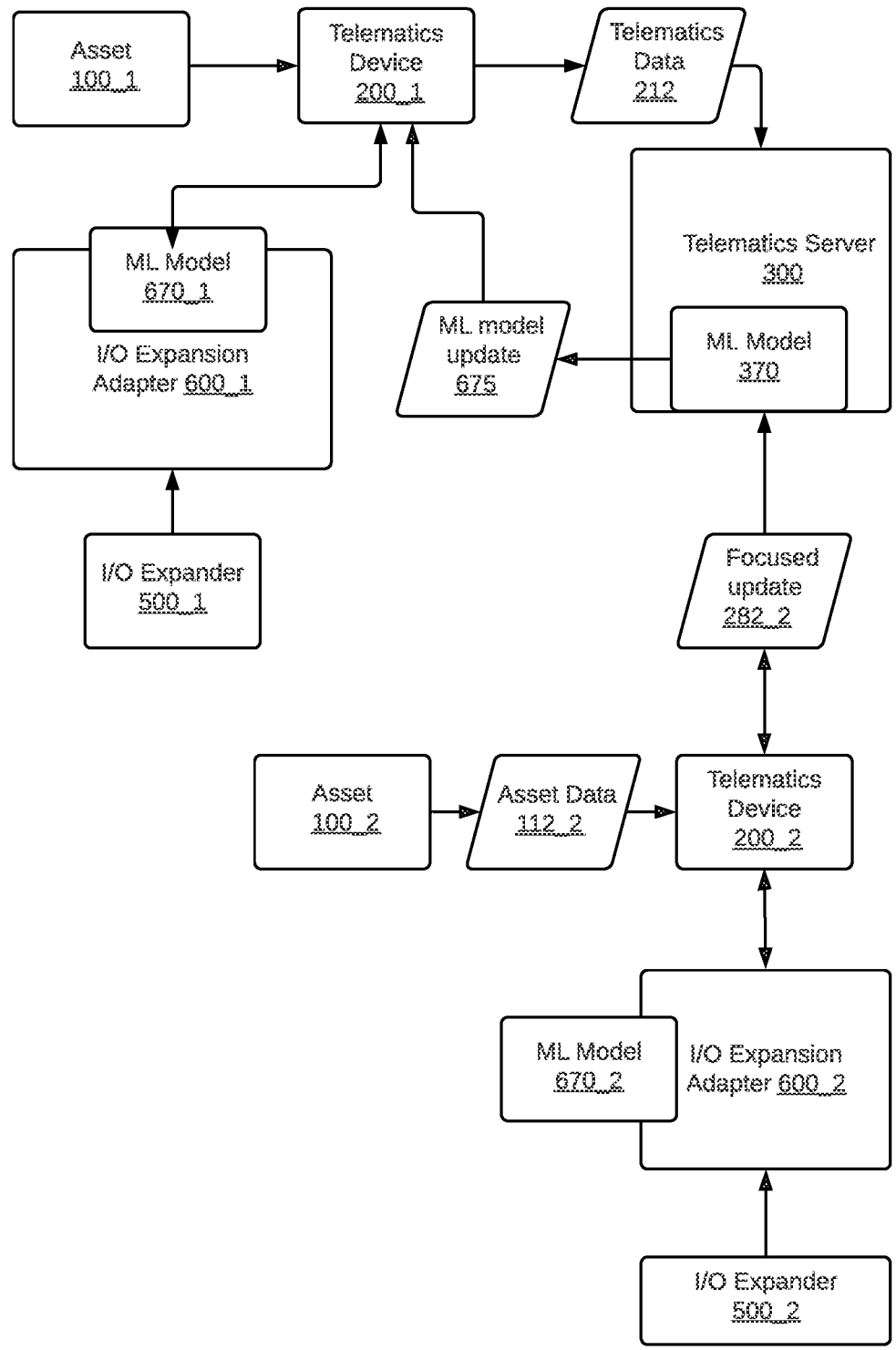
FIG. 9B is a block diagram of a system for updating a centralized ML model by an ML model on an I/O expansion adapter using federated learning, in accordance with embodiments of the present disclosure.

FIG. 9B depicts a telematics system which employs federated learning for sharing a prediction ML model between I/O expansion adapters, in accordance with embodiments of the present disclosure. In the depicted embodiment, an ML model 670_2 is trained on the I/O expansion adapter 600_2 using training data obtained from the asset data 112_2 and the I/O Expander 500_2. For example, the asset data 112_2 may contain odometer data and the I/O expansion data may contain images of the asset's dashboard. The combination of the odometer data and the dashboard images comprises training data for training the ML model 670_2 to determine odometer values based on dashboard images containing an odometer. As the ML model 670_2 is improved, the I/O expansion adapter may send, via the telematics device 200_2 or otherwise, a focused update 282_2 to the telematics server 300. The focused update 282_2 may be sent to the telematics server using encrypted communications. The focused update is averaged, at the telematics server 300, with other similar updates from other I/O expansion adapters (not shown) and used to improve the centralized ML model 370. All the training data is thus kept on the I/O expansion adapters and not sent to the cloud preserving the privacy of the data. The centralized ML model 370 may be shared with other I/O expansion adapters such as the ML model 670_1 as described above.

While FIGS. 7A, 9A and 9B have shown the I/O expansion adapter 600 and the I/O expander 500 as separate blocks, this may not necessarily be the case. The I/O expansion adapter 600 and the I/O expander 500 may be integrated into a single device. For example, with reference to FIG. 10, the I/O expander 500 contains a controller 630, a memory 640, an uplink interface 650 a DMA controller 680, and sensors 504. The sensors 504 may be image-capturing sensors such as digital cameras producing video frames as described above. In operation, the sensors 504 produce raw I/O expansion data 515. The DMA controller 680 buffers the raw data in the buffer 642. The I/O expansion adapter firmware module 672 directs the buffered data to the ML model 670 to produce processed I/O expansion data 615 which is sent over the uplink interface 650 to the telematics device 200. As discussed above, the ML model 670 may be updated by a telematics server.

Figure 11:
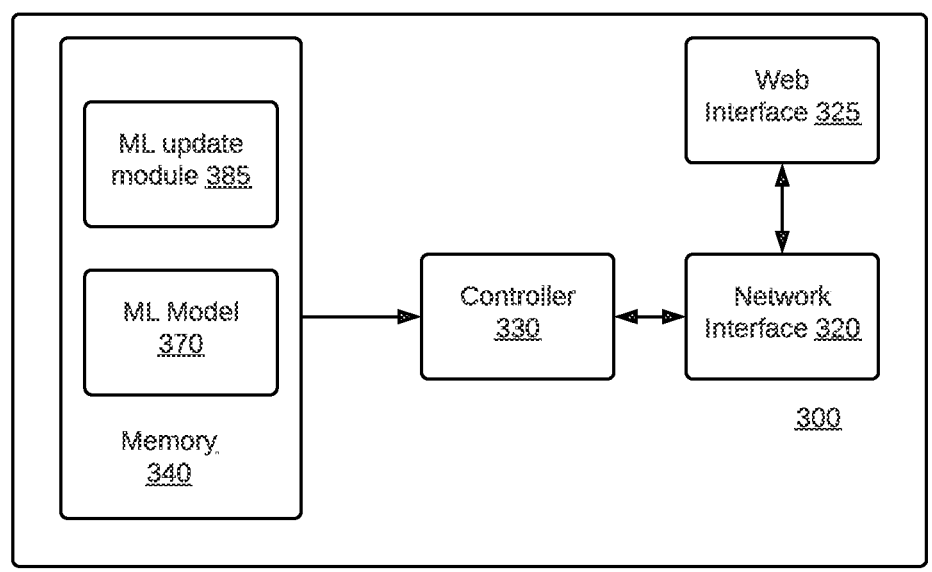
FIG. 11 is a block diagram of a telematics server, in accordance with embodiments of the present disclosure.

FIG. 11 depicts a simplified block diagram for the telematics server 300. The various components of the telematics server 300 have been described above. The memory 340 stores the centralized ML model 370 and an ML update module 385. The ML update module 385 includes machine-executable programming instructions which configure the telematics server 300 to send the ML model update 675 as described above. In some embodiments, the machine-executable instructions comprise machine-executable instructions which configure the telematics server to send the machine-learning model update in response to receiving a machine-learning update request.

FIG. 11 depicts a method 1100 performed by a telematics server 300 for updating a machine learning model on a device. At step 1110 the telematics server 300 receives over a network, training data including model input data and a known output label corresponding to the model input data from a first device. At step 1120, the telematics server trains a centralized machine-learning model using the training data. At step 1130, the telematics server determines, by the centralized machine-learning model, an output label prediction certainty based on the model input data. At step 1140, the telematics server determines an increase in the output label prediction certainty over a prior predicted output label certainty of the centralized machine-learning model. At step 1150, the telematics server checks whether the increase in prediction certainty of the output label is greater than an output label prediction increase threshold. Finally at step 1160, the telematics server sends, over the network a machine-learning model update to a second device in response to determining that the increase in the output label prediction certainty is greater than the output label prediction increase threshold.

Figure 12:
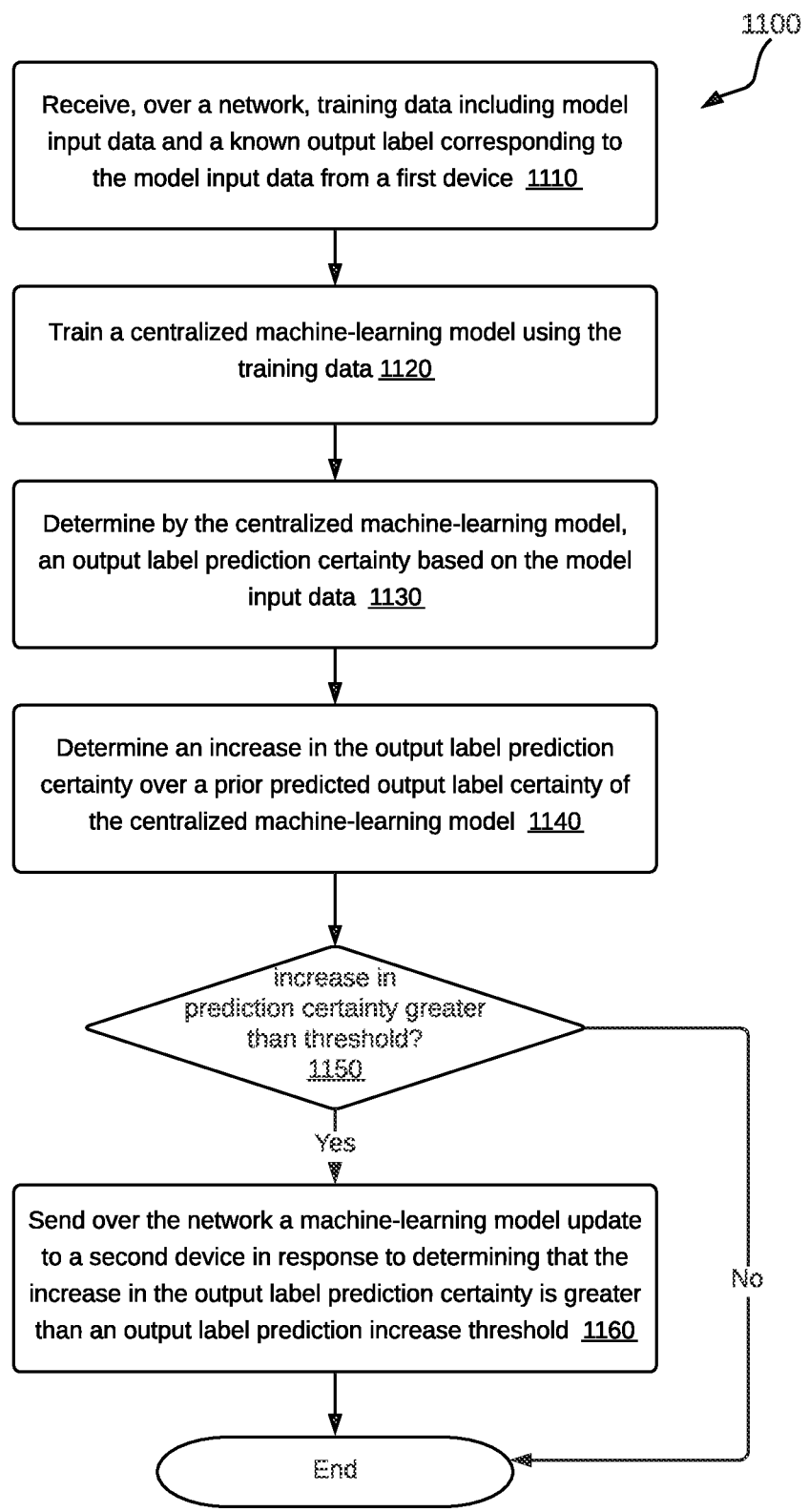
FIG. 12 depicts a method performed by a telematics server for updating a machine learning model on a device, in accordance with embodiments of the present disclosure.
Figure 13:
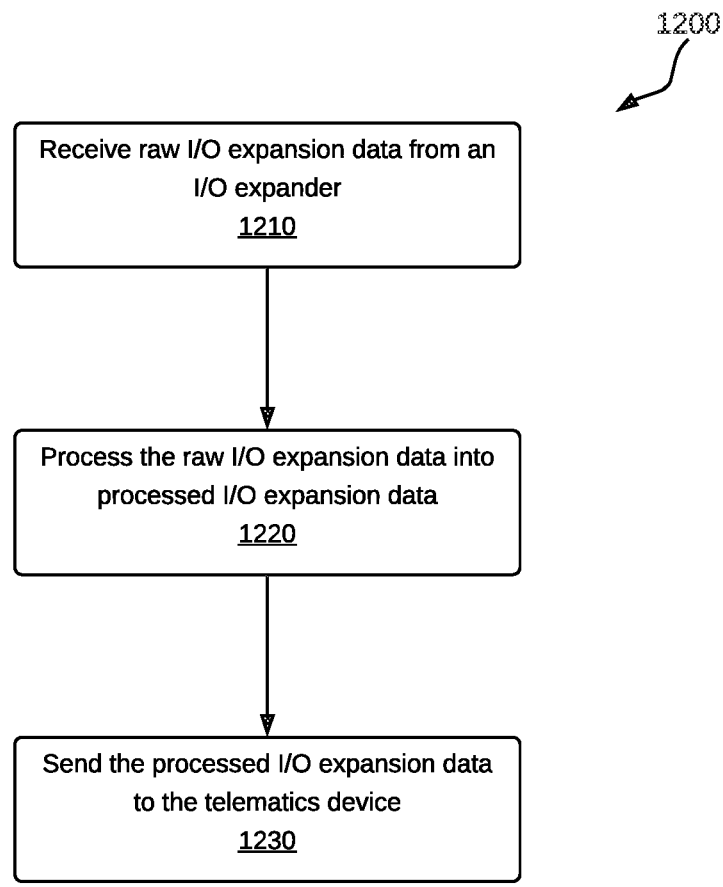
FIG. 13 depicts a method performed by an input/output expansion (I/O expansion) device for processing I/O expansion data, in accordance with embodiments of the present disclosure.

It should be noted that certain operations in the method 1100 may be embodied in machine-executable programming instructions storable on non-transitory machine-readable storage medium and executable by a processor or a controller FIG. 12 depicts a method 1200 performed by an I/O expansion adapter 600 for processing I/O expansion data. At step 1210, the I/O expansion adapter is configured to receive raw I/O expansion data from an I/O expander. At step 1220, the I/O expansion adapter is configured to process the raw I/O expansion data into processed I/O expansion data. At step 1230, the I/O expansion adapter is configured to send the processed I/O expansion data to the telematics device.

It should be noted that certain operations in the method 1200 may be embodied in machine-executable programming instructions storable on non-transitory machine-readable storage medium and executable by a processor or a controller.

Figure 14:
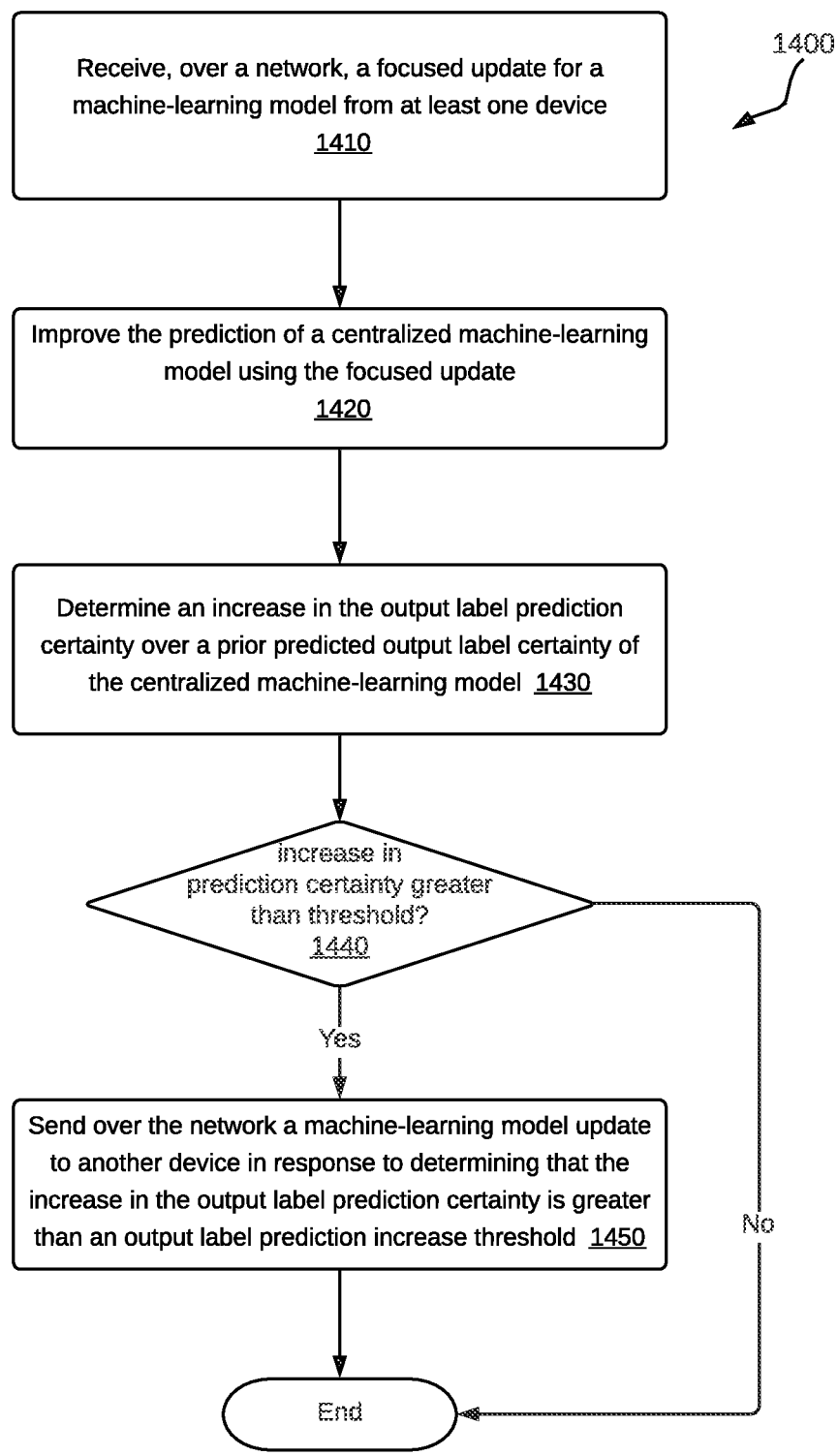
FIG. 14 depicts a method performed by a telematics server for updating a machine-learning model on a device using federated learning, in accordance with embodiments of the present disclosure.
Figure 15:
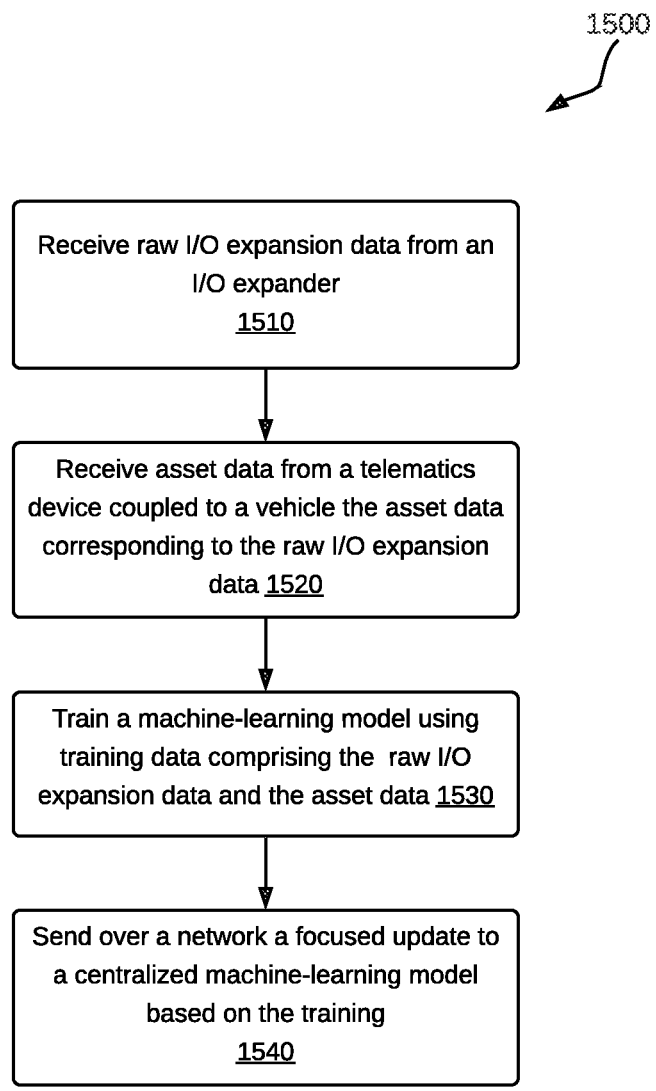
FIG. 15 depicts a method performed by an I/O expansion adapter for training a machine-learning model and sending a focused update to a centralized machine-learning model on a server, in accordance with embodiments of the present disclosure.

FIG. 14 depicts a method 1400 performed by a telematics server 300 for updating a machine learning model on a device using federated learning as described with reference to the architecture shown in FIG. 9B. At step 1410, the telematics server 300 receives, over a network such as network 50, a focused update for a machine-learning model from at least one device. The focused update may comprise a plurality of updated model parameters. For example, the at least one device may have received training data to train a machine-learning model thereon thus updating the model parameters. In some embodiments the at least one device may comprise a plurality of devices each sending a focused update 282_2 to the telematics server 300.

At step 1420, the telematics server 300 improves the output prediction of a centralized ML model 370 using the focused update. In some embodiments, the telematics server averages the plurality of updated model parameters received from the plurality of devices that each sends a focused update. The telematics server may then update the model parameters of the centralized machine-learning model with the averaged model parameters.

At step 1430, the telematics server 300 determines an increase in the output label prediction of the centralized machine-learning model certainty over a prior predicted output label certainty. For example, the telematics server may utilize some labelled data for which a prior output prediction certainty has been computed, then run the same labelled data in the centralized machine-learning model after the parameter model has been updated based on the focused update.

At step 1440, the telematics server 300 checks whether the increase in output prediction certainty is greater than a particular threshold. For example, if the output prediction certainty improves by 6% and the threshold is 5%, then the output prediction certainty is greater than the particular threshold and control goes to step 1450. If the output prediction certainty is not greater than the particular threshold then the method ends.

At step 1450, the telematics server 300 sends, over the network 50, an ML model update 675 to an I/O expansion adapter such as the I/O expansion adapter 600_1.

It should be noted that certain operations in the method 1400 may be embodied in machine-executable programming instructions storable on non-transitory machine-readable storage medium and executable by a processor or a controller.

In a further embodiment of the present disclosure, there is provided a method 1500 by an I/O expansion adapter, such as the I/O expansion adapter 600. The method starts at step 1510 at which an I/O expansion adapter, such as the I/O expansion adapter 600_2 receives raw I/O expansion data from an I/O expander such as the I/O expander 500_2. The raw I/O expansion data may comprise image data or any other form of data that requires AI processing as discussed above.

At step 1520, the I/O expander receives, from the telematics device 200_2, the asset data 112_2 corresponding to the raw I/O expansion data. The asset data 112_2 may contain an output value corresponding to the raw I/O expansion data. For example, the raw I/O expansion data may be a dashboard image containing an odometer image, and the asset data 112_2 may contain an odometer value corresponding to the odometer image. Accordingly, a portion of the asset data and the raw I/O expansion data comprise training data.

At step 1530, the I/O expansion adapter 600_2 trains a machine-learning model 670_2 using the training data which comprises a portion of the asset data 112_2 and the raw I/O expansion data. For example, the ML model 670_2 may be trained to better determine an odometer reading from a dashboard image. As a result of training the ML model 670_2 the model parameters are updated.

At step 1540, the I/O expansion adapter 600_2 sends, over a network, a focused update 282_2 to a centralized ML model 370. The centralized ML model 370 may be on the telematics server 300. In some embodiments, the focused update 282_2 is sent to the telematics server 300, via the telematics device 200_2. In other embodiments, the I/O expansion adapter 600_2 communicates directly with the telematics server 300 and sends the focused update 282_2 thereto.

It should be noted that certain operations in the method 1500 may be embodied in machine-executable programming instructions storable on non-transitory machine-readable storage medium and executable by a processor or a controller It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method, comprising:
   training, by a controller of a first input/output (I/O) expansion adapter, a first machine-learning model residing in a memory of the I/O expansion adapter, using:
   model input data comprising a first raw I/O expansion data received by the first I/O expansion adapter from a first I/O expander coupled to the first I/O expansion adapter, and
   a known output label corresponding to the model input data, the known output label comprising asset data from a first telematics device coupled to the first I/O expansion adapter;
   in response to detecting an improvement of the first machine-learning model, sending, by the first I/O expansion adapter over a network, a federated learning focused update to a telematics server;

improving, by the telematics server, an output label prediction certainty of a centralized machine-learning model based on the federated learning focused update;

determining, by the telematics server, an increase in the output label prediction certainty over a prior predicted output label certainty of the centralized machine-learning model;

sending, by the telematics server, over the network, a machine-learning model update to a second I/O expansion adapter coupled to a second telematics device which is coupled to a second I/O expander, in response to determining that the increase in the output label prediction certainty is greater than an output label prediction increase threshold of the centralized machine-learning model;

updating, by a second controller of the second I/O expansion adapter, a second machine-learning model residing in a second memory of the second I/O expansion adapter using the machine-learning model update sent by the telematics server; and generating, at the second I/O expansion adapter, output data based on a second raw I/O expansion data received from the second I/O expander, using the second machine-learning model.

2. The method of claim 1, wherein determining the increase in the output label prediction certainty over a prior output label certainty comprises comparing the output label prediction certainty with the output label prediction certainty of a prior machine-learning model update.

3. The method of claim 1, wherein the output label prediction increase threshold comprises a percentage increase in the output label prediction certainty.

4. The method of claim 1, wherein the model input data comprises at least one image of a vehicle's dashboard and the known output label comprises a vehicle parameter corresponding to a gauge on the vehicle's dashboard.

5. The method of claim 1, wherein the model input data comprises at least one image of a vehicle's driver and the known output label comprises a vehicle parameter indicating whether a driver seatbelt of a vehicle is fastened.

6. The method of claim 1, wherein sending the machine-learning model update is further done periodically.

7. The method of claim 1, wherein sending the machine-learning model update is further done in response to receiving, from the second I/O Expansion Adapter, a machine-learning model update request.

8. The method of claim 1, wherein the I/O expansion data comprises raw data received from the second I/O expander.

9. A telematics system, comprising:
a telematics server;
a network;
a first telematics device in communication with the telematics server over the network;
a first input/output (I/O) expansion adapter coupled to the first telematics device, the first I/O expansion adapter having a first memory and a first controller;
a first I/O expander coupled to the first I/O expansion adapter;
a second telematics device in communication with the telematics server over the network;
a second I/O expansion adapter coupled to the second telematics device, the second I/O expansion adapter having a second memory and a second controller; and
a second I/O expander coupled to the second I/O expansion adapter;

wherein:
the first I/O expansion adapter trains, by the first controller, a first machine-learning model residing in the first memory using:
model input data comprising a first raw I/O expansion data from the first I/O expander, and
a known output label corresponding to the model input data, the known output label comprising asset data from the first telematics device;

in response to detecting an improvement of the first machine-learning model, the first I/O expander sends a federated learning focused update to the telematics server;

the telematics server improves an output label prediction certainty of a centralized machine-learning model based on the focused update;

the telematics server determines an increase in the output label prediction certainty over a prior predicted output label certainty of the centralized machine-learning model; and the telematics server sends, over the network, a machine-learning model update to the second I/O expansion adapter in response to determining that the increase in the output label prediction certainty is greater than an output label prediction increase threshold of the centralized machine-learning model;

the second controller of the second I/O expansion adapter updates a second machine-learning model residing in the second memory using the machine-learning model update sent by the telematics server; and the second I/O expansion adapter generates processed output data based on a second raw I/O expansion data received from the second I/O expander, using the second machine-learning model.

10. The telematic system of claim 9, wherein the telematics server determines an increase in the output label prediction certainty over a prior predicted output label certainty of the centralized machine-learning model by comparing the output label prediction certainty with the output label prediction certainty of a prior machine-learning model update.

11. The telematics system of claim 9, wherein the output label prediction increase threshold comprises a percentage increase in the output label prediction certainty.

12. The telematics system of claim 9, wherein the I/O expansion data comprises raw data received from the second I/O expander.

13. The telematics system of claim 9, wherein the model input data comprises at least one image of a vehicle's dashboard and the known output label comprises a vehicle parameter corresponding to a gauge on the vehicle's dashboard.

14. The telematics system of claim 9, the model input data comprises at least one image of a vehicle's driver and the known output label comprises a vehicle parameter indicating whether a driver seatbelt of a vehicle is fastened.

15. The telematics system of claim 9, wherein the telematics server sends, over the network, the machine-learning model update to the second I/O expansion adapter periodically.

* * * * *